United States Patent
Bartley

(10) Patent No.: US 10,813,807 B2
(45) Date of Patent: Oct. 27, 2020

(54) PATIENT SUPPORT SYSTEMS WITH HOLLOW ROTARY ACTUATORS

(71) Applicant: Stryker Corporation, Kalamazoo, MI (US)

(72) Inventor: Gary L. Bartley, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 631 days.

(21) Appl. No.: 15/635,802

(22) Filed: Jun. 28, 2017

(65) Prior Publication Data

US 2018/0000674 A1 Jan. 4, 2018

Related U.S. Application Data

(60) Provisional application No. 62/356,362, filed on Jun. 29, 2016.

(51) Int. Cl.
*A61G 7/018* (2006.01)
*A61G 7/015* (2006.01)
(Continued)

(52) U.S. Cl.
CPC ............ *A61G 7/018* (2013.01); *A61G 7/005* (2013.01); *A61G 7/012* (2013.01); *A61G 7/015* (2013.01);
(Continued)

(58) Field of Classification Search
CPC ........ A61G 7/018; A61G 7/015; A61G 7/012; A61G 7/005; A61G 7/0516; A61G 7/0524;
(Continued)

(56) References Cited

U.S. PATENT DOCUMENTS 347,024 A * 8/1886 Bonnefoy .............. A61G 7/015
5/618
493,303 A * 3/1893 Seymour ................ A61G 7/015
5/617
(Continued)

FOREIGN PATENT DOCUMENTS

CN 205859053 U 1/2017
FR 2714135 * 6/1995 ............... F16H 1/28
(Continued)

OTHER PUBLICATIONS

YouTube, Renold Sprag Latch, published May 28, 2012; URL: https://www.youtube.com/watch?v=Fsp3fm4KHs0.
(Continued)

*Primary Examiner* — Nicholas F Polito
*Assistant Examiner* — Luke Hall
(74) *Attorney, Agent, or Firm* — Howard & Howard Attorneys PLLC

(57) ABSTRACT

A patient support apparatus with a patient support surface, a first member, a movable member movable relative to the first member, and an actuator coupled to the movable member to move the movable member relative to the first member. The actuator includes motor and a gear assembly defining a through passage. The gear assembly has an input member, an output member connected to the movable member, and a gear arrangement operable between the input member and the output member. The motor is configured to apply torque to the input member to rotate the output member through the gear arrangement.

21 Claims, 16 Drawing Sheets

(51) Int. Cl.
*A61G 7/012* (2006.01)
*A61G 7/005* (2006.01)
*A61G 7/05* (2006.01)
*F16H 1/00* (2006.01)

(52) U.S. Cl.
CPC ......... *A61G 7/0506* (2013.01); *A61G 7/0524* (2016.11); *F16H 1/003* (2013.01)

(58) Field of Classification Search
CPC .... A61G 7/0513; A61G 7/0506; A61G 7/002; A61G 2200/18; F16H 1/28–48
USPC .......................................................... 5/611
See application file for complete search history.

(56) References Cited

U.S. PATENT DOCUMENTS

| | | | | |
|---|---|---|---|---|
| 1,218,519 | A * | 3/1917 | Bradley | A61G 7/015 5/618 |
| 1,365,876 | A * | 1/1921 | Watson | A61G 7/015 5/617 |
| 1,374,614 | A * | 4/1921 | Sturgeon | F16H 1/32 475/168 |
| 1,529,699 | A * | 3/1925 | Hawk | A61G 7/002 5/618 |
| 1,564,596 | A * | 12/1925 | Grasso | A61G 7/015 5/611 |
| 1,629,277 | A * | 5/1927 | Koeb | E05F 11/382 192/223.1 |
| 1,682,563 | A * | 8/1928 | Hill | B23F 15/08 74/462 |
| 2,271,201 | A * | 1/1942 | Mehr | A61G 7/015 5/613 |
| 2,481,477 | A * | 9/1949 | Peery | A47C 20/041 74/89.26 |
| 2,504,737 | A * | 4/1950 | Sharpes | B64C 11/343 416/152 |
| 2,541,529 | A * | 2/1951 | McVicker | A61G 7/018 74/625 |
| 2,564,083 | A * | 8/1951 | Stechert | A61G 7/015 5/618 |
| 2,605,481 | A | 8/1952 | Burkhart | |
| 2,630,720 | A * | 3/1953 | Gambill | A61G 7/015 474/86 |
| 2,696,207 | A * | 12/1954 | Bushnell | A61H 1/003 601/91 |
| 2,913,300 | A | 11/1959 | Darnell et al. | |
| 2,947,364 | A * | 8/1960 | Haworth | B64C 11/40 416/26 |
| 3,039,118 | A * | 6/1962 | Hutt | A61G 7/012 5/611 |
| 3,120,836 | A * | 2/1964 | Brauning | A61D 3/00 119/756 |
| 3,129,607 | A | 4/1964 | Schaefer | |
| 3,198,891 | A | 8/1965 | Burst et al. | |
| 3,278,952 | A | 10/1966 | Holm | |
| 3,307,663 | A * | 3/1967 | Luenberger | F16B 1/04 192/223 |
| 3,475,993 | A * | 11/1969 | Hewko | F16H 13/06 475/195 |
| 3,503,082 | A * | 3/1970 | Malcolm | A61G 7/015 5/601 |
| 3,510,886 | A * | 5/1970 | Benoit | A61G 7/002 5/611 |
| 3,532,882 | A * | 10/1970 | Craig | A61B 6/04 5/611 |
| 3,558,944 | A * | 1/1971 | Verge | H02K 25/00 310/82 |
| 3,581,319 | A * | 6/1971 | Stanley et al. | A61G 7/002 5/616 |
| 3,583,248 | A * | 6/1971 | Langenberg | F16H 25/2454 74/89.39 |
| 3,587,482 | A * | 6/1971 | Wieland | A47B 9/00 108/147 |
| 3,611,453 | A * | 10/1971 | Lokken | A61G 7/005 5/610 |
| 3,624,847 | A * | 12/1971 | Murcott et al. | A61G 7/0507 5/429 |
| 3,627,377 | A * | 12/1971 | Pickles | B60J 7/1269 296/117 |
| 3,629,540 | A * | 12/1971 | Altfeld | B23H 7/28 219/69.2 |
| 3,640,520 | A * | 2/1972 | Wieland | A61G 13/009 5/610 |
| 3,660,917 | A * | 5/1972 | Bevan | G09F 11/02 40/473 |
| 3,797,273 | A * | 3/1974 | Benoit | A61G 7/018 464/177 |
| 3,826,152 | A * | 7/1974 | Alexeev | F16H 3/363 74/424.5 |
| 3,828,538 | A * | 8/1974 | Yoshida | D07B 3/10 57/58.54 |
| 3,866,852 | A * | 2/1975 | Kunz | B21C 47/14 242/361.2 |
| 3,877,088 | A * | 4/1975 | Bouman | A61G 7/015 5/618 |
| 3,879,772 | A * | 4/1975 | Pol | A61G 7/015 5/615 |
| 3,882,737 | A * | 5/1975 | Crim | A61B 17/1617 74/665 S |
| 3,897,843 | A * | 8/1975 | Hapeman | B60K 17/14 180/65.51 |
| 3,921,264 | A | 11/1975 | Madonian et al. | |
| 3,972,081 | A | 8/1976 | Stern et al. | |
| 4,047,842 | A * | 9/1977 | Avena | F01D 7/00 416/152 |
| 4,062,075 | A | 12/1977 | Stern et al. | |
| 4,067,403 | A * | 1/1978 | Richmond | A61B 17/1697 173/213 |
| 4,071,029 | A * | 1/1978 | Richmond | A61B 17/1662 433/105 |
| 4,114,039 | A * | 9/1978 | Tomita | A61B 6/04 378/179 |
| 4,271,726 | A * | 6/1981 | Ryffel | F16H 1/32 418/61.3 |
| 4,360,213 | A * | 11/1982 | Rudwick | A61G 5/00 16/35 D |
| 4,361,056 | A * | 11/1982 | George | F16H 37/16 242/432.4 |
| 4,379,976 | A * | 4/1983 | Pitchford | B05B 3/12 310/82 |
| 4,398,313 | A | 8/1983 | Mitchell | |
| 4,425,673 | A | 1/1984 | Werner | |
| 4,449,262 | A * | 5/1984 | Jahsman | A61G 7/002 248/421 |
| 4,472,845 | A | 9/1984 | Chivetta et al. | |
| 4,472,846 | A | 9/1984 | Volk, Jr. et al. | |
| 4,480,733 | A | 11/1984 | Grimm et al. | |
| 4,499,618 | A | 2/1985 | Werner | |
| 4,559,655 | A * | 12/1985 | Peck | A61G 7/015 5/616 |
| 4,618,133 | A * | 10/1986 | Siczek | A61B 6/447 378/209 |
| 4,658,675 | A * | 4/1987 | Murray | F16H 1/32 475/168 |
| 4,718,355 | A * | 1/1988 | Houghton | A47B 9/16 108/147 |
| 4,747,212 | A | 5/1988 | Cavdek | |
| 4,762,332 | A * | 8/1988 | Seol | A61G 5/023 192/28 |
| 4,806,197 | A * | 2/1989 | Harvey | B65C 3/16 156/238 |
| 4,837,877 | A * | 6/1989 | Hamada | A47C 17/84 5/10.2 |
| 4,890,979 | A * | 1/1990 | Ames | B64C 11/325 416/153 |
| 4,914,330 | A * | 4/1990 | Pierrat | H02K 41/06 310/80 |

(56) References Cited

U.S. PATENT DOCUMENTS

| | | | | |
|---|---|---|---|---|
| 5,023,967 A * | 6/1991 | Ferrand | A61G 7/00 | 5/185 |
| 5,071,393 A * | 12/1991 | Genovese | F16H 3/70 | 475/166 |
| 5,072,463 A * | 12/1991 | Willis | A61G 7/005 | 5/616 |
| 5,074,000 A * | 12/1991 | Soltani | A61G 7/005 | 254/9 C |
| 5,102,377 A * | 4/1992 | Spanski | B25J 9/102 | 475/162 |
| 5,269,031 A | 12/1993 | Alexander | | |
| 5,320,630 A * | 6/1994 | Ahmed | A61B 17/12013 | 600/101 |
| 5,343,581 A * | 9/1994 | Bartley | A61G 7/018 | 254/103 |
| 5,355,743 A * | 10/1994 | Tesar | B25J 9/08 | 475/149 |
| 5,362,081 A * | 11/1994 | Beidler | A61G 5/02 | 280/236 |
| 5,365,622 A * | 11/1994 | Schirmer | A61G 1/0565 | 5/611 |
| 5,385,153 A * | 1/1995 | Jamieson | A61G 7/065 | 128/869 |
| 5,462,559 A * | 10/1995 | Ahmed | A61B 17/12013 | 606/139 |
| 5,482,305 A * | 1/1996 | Jeffries | A61G 5/023 | 280/250.1 |
| 5,518,466 A | 5/1996 | Tiedeman | | |
| 5,624,453 A * | 4/1997 | Ahmed | A61B 17/12013 | 606/139 |
| 5,727,850 A * | 3/1998 | Masclet | A61G 5/10 | 301/111.03 |
| 5,810,770 A * | 9/1998 | Chin | A61M 3/0258 | 604/65 |
| 5,846,154 A * | 12/1998 | Godin | A61G 5/02 | 475/331 |
| 5,957,474 A * | 9/1999 | Mundy | A61G 5/00 | 280/250.1 |
| 6,024,664 A * | 2/2000 | Shaffner | F16H 13/08 | 475/170 |
| 6,044,718 A * | 4/2000 | Lester | F16H 29/02 | 475/14 |
| 6,080,076 A * | 6/2000 | Kwoka | F16H 48/285 | 475/160 |
| 6,101,648 A * | 8/2000 | Sommerfeld | A61G 7/015 | 5/613 |
| 6,203,041 B1 * | 3/2001 | Helm | A61G 5/10 | 192/41 A |
| 6,231,012 B1 * | 5/2001 | Cacciola | B64D 45/0005 | 244/213 |
| 6,276,703 B1 * | 8/2001 | Caldwell | B62M 1/14 | 280/211 |
| 6,343,805 B1 * | 2/2002 | Roy | A61G 5/08 | 280/250.1 |
| 6,461,265 B1 * | 10/2002 | Graham | F16H 3/724 | 475/5 |
| 6,510,852 B1 * | 1/2003 | Shiery | A47G 9/10 | 128/845 |
| 6,631,797 B2 * | 10/2003 | Capewell | B64C 13/28 | 192/223 |
| 6,631,886 B1 * | 10/2003 | Caudle | B66D 1/00 | 254/327 |
| 6,640,363 B1 * | 11/2003 | Pattee | A61B 6/0457 | 5/601 |
| 6,739,004 B1 * | 5/2004 | Abrahamsen | A47C 20/041 | 5/610 |
| 6,758,780 B2 * | 7/2004 | Witzel | F16H 13/06 | 475/11 |
| 6,805,371 B2 * | 10/2004 | Meginniss, III | A61G 5/02 | 280/250.1 |
| 6,907,945 B2 * | 6/2005 | Kim | A61G 5/061 | 180/8.2 |
| 6,958,071 B2 * | 10/2005 | Carusillo | A61B 17/32002 | 606/170 |
| 7,041,024 B2 * | 5/2006 | Becker | B60N 2/0232 | 475/162 |
| 7,223,197 B2 * | 5/2007 | Poulin | F02C 7/36 | 475/331 |
| 7,377,362 B2 * | 5/2008 | Blodgett, Jr. | B60P 3/39 | 187/222 |
| 7,395,564 B2 * | 7/2008 | McDaniel | A61G 7/015 | 5/614 |
| 7,526,913 B2 * | 5/2009 | Orlando | F01D 1/26 | 415/9 |
| 7,597,647 B2 * | 10/2009 | Calinescu | B60N 2/6673 | 475/331 |
| 7,631,749 B2 * | 12/2009 | Somasundaram | A61G 13/02 | 198/468.9 |
| 7,658,537 B2 * | 2/2010 | Coffeen | A61B 17/8822 | 366/189 |
| 7,802,331 B2 | 9/2010 | Brown et al. | | |
| 7,955,203 B2 * | 6/2011 | Siman-Tov | F16G 13/02 | 474/148 |
| 8,002,774 B2 * | 8/2011 | Burmeister, III | B02C 18/16 | 606/79 |
| 3,056,981 A1 | 11/2011 | Kojima et al. | | |
| 8,056,981 B2 * | 11/2011 | Kojima | B60N 2/0232 | 297/362.11 |
| 8,147,368 B2 * | 4/2012 | Breitfeld | H02K 7/116 | 475/149 |
| 8,147,451 B2 * | 4/2012 | Brockman | A61M 5/14244 | 604/151 |
| 8,171,823 B2 * | 5/2012 | Koga | B60N 2/0232 | 74/425 |
| 3,312,579 A1 | 11/2012 | Bock | | |
| 8,308,599 B2 * | 11/2012 | Akami | F16H 1/32 | 475/178 |
| 8,312,579 B2 * | 11/2012 | Bock | A47C 20/041 | 5/613 |
| 8,413,277 B2 * | 4/2013 | Davis | A61G 7/1011 | 137/512.1 |
| 8,484,779 B1 * | 7/2013 | Bradwell | A61G 13/0027 | 108/24 |
| 8,505,137 B1 * | 8/2013 | Gaines, Jr. | A61B 6/0457 | 108/147 |
| 8,591,367 B2 * | 11/2013 | Kochan | F16H 1/003 | 475/149 |
| 8,776,284 B2 * | 7/2014 | Jones | B60P 3/39 | 5/10.2 |
| 8,845,029 B2 * | 9/2014 | Voelz | B60N 2/22 | 297/362.11 |
| 8,931,796 B2 * | 1/2015 | Nasser | A61G 5/021 | 280/304.1 |
| 8,981,271 B1 * | 3/2015 | Risner | F24S 23/77 | 250/203.4 |
| 9,400,035 B1 * | 7/2016 | Edsinger | F16H 1/32 | |
| 9,657,516 B2 * | 5/2017 | Graybar | E06B 9/70 | |
| 10,011,190 B2 * | 7/2018 | Markel | B60N 2/22 | |
| 10,124,874 B1 | 11/2018 | Jaeger et al. | | |
| 2002/0065171 A1 * | 5/2002 | Raber | F16D 21/06 | 477/175 |
| 2002/0089223 A1 * | 7/2002 | Yu | B60N 2/3013 | 297/362.11 |
| 2002/0179430 A1 * | 12/2002 | Griego | C25D 17/16 | 204/199 |
| 2003/0009825 A1 * | 1/2003 | Gallant | A61G 7/02 | 5/81.1 R |
| 2003/0079289 A1 * | 5/2003 | Vrzalik | A61G 7/0507 | 5/618 |
| 2005/0014595 A1 * | 1/2005 | Minegishi | F16H 1/32 | 475/165 |
| 2005/0067807 A1 * | 3/2005 | Harcourt | A61G 5/1008 | 280/246 |
| 2005/0160856 A1 * | 7/2005 | Sugitani | F16H 25/2252 | 74/424.92 |
| 2005/0229312 A1 * | 10/2005 | Bishop | A61G 1/0287 | 5/620 |

(56) References Cited

U.S. PATENT DOCUMENTS

| | | | |
|---|---|---|---|
| 2005/0273932 A1* | 12/2005 | Horlin | A47C 21/006 5/611 |
| 2005/0287922 A1* | 12/2005 | Sinisi | A63H 33/40 446/454 |
| 2006/0016008 A1* | 1/2006 | Choi | A61G 1/042 5/611 |
| 2006/0059814 A1* | 3/2006 | Metz | A61G 7/0527 52/309.8 |
| 2006/0075558 A1* | 4/2006 | Lambarth | A61G 1/0293 5/611 |
| 2006/0082176 A1* | 4/2006 | Broadley | A61G 1/0212 296/20 |
| 2006/0085919 A1* | 4/2006 | Kramer | A47C 27/083 5/713 |
| 2006/0207027 A1* | 9/2006 | Matunaga | A61G 1/0262 5/611 |
| 2006/0247089 A1 | 11/2006 | Guo et al. | |
| 2006/0265807 A1* | 11/2006 | Choy | A61G 1/052 5/611 |
| 2007/0000057 A1* | 1/2007 | Ward | A61G 1/0218 5/611 |
| 2007/0095618 A1* | 5/2007 | Lai | A61G 5/0891 188/2 F |
| 2007/0174965 A1 | 8/2007 | Lemire et al. | |
| 2007/0226901 A1* | 10/2007 | Pervorse | B60P 3/39 5/118 |
| 2008/0045374 A1 | 2/2008 | Weinberg et al. | |
| 2008/0235876 A1* | 10/2008 | Sundstrom | A61G 13/08 5/611 |
| 2008/0252036 A1* | 10/2008 | Smurthwaite | A61G 5/025 280/250.1 |
| 2008/0256709 A1* | 10/2008 | Weiler | A61G 1/0237 5/611 |
| 2009/0049613 A1* | 2/2009 | Dippl | A61G 13/06 5/611 |
| 2009/0062053 A1* | 3/2009 | Kobayashi | F16H 49/001 475/166 |
| 2009/0078482 A1* | 3/2009 | Kylstra | A61G 5/10 180/65.1 |
| 2009/0126114 A1* | 5/2009 | Kral | A61G 7/053 5/611 |
| 2009/0165208 A1* | 7/2009 | Reed | A61G 1/0287 5/611 |
| 2009/0166995 A1* | 7/2009 | Sorquist | A61G 5/023 280/249 |
| 2009/0176615 A1* | 7/2009 | Gasparrini | F16H 1/46 475/331 |
| 2009/0178199 A1* | 7/2009 | Brauers | A61G 5/10 5/611 |
| 2010/0004087 A1* | 1/2010 | Minegishi | F16H 1/32 475/180 |
| 2010/0056321 A1* | 3/2010 | Snyder | F02C 7/36 475/331 |
| 2010/0205741 A1* | 8/2010 | Sevadjian | A61G 13/06 5/611 |
| 2010/0257671 A1* | 10/2010 | Shimada | A47C 19/04 5/611 |
| 2010/0292043 A1* | 11/2010 | Tao | F16H 57/028 475/344 |
| 2011/0092332 A1 | 4/2011 | Evenson | |
| 2011/0113556 A1* | 5/2011 | Roussy | A61G 1/017 5/611 |
| 2011/0241306 A1 | 10/2011 | Serkh et al. | |
| 2011/0251010 A1* | 10/2011 | Grimm | F16C 17/047 475/159 |
| 2011/0271779 A1* | 11/2011 | Corcoran | F16H 25/20 74/89.23 |
| 2011/0319217 A1* | 12/2011 | Imase | F16H 1/32 475/168 |
| 2012/0060276 A1* | 3/2012 | Heidlage | A61G 7/012 5/11 |
| 2012/0068635 A1* | 3/2012 | Koch | A61G 7/012 318/135 |
| 2012/0074700 A1* | 3/2012 | Ciszak | F03D 15/10 290/44 |
| 2012/0267932 A1* | 10/2012 | Narita | B60N 2/2254 297/354.1 |
| 2013/0061392 A1* | 3/2013 | Zerhusen | A61G 7/1076 5/87.1 |
| 2013/0145871 A1* | 6/2013 | Lee | B60J 7/0573 74/89.14 |
| 2013/0269305 A1* | 10/2013 | Wang | A01D 34/78 56/14.7 |
| 2013/0274049 A1* | 10/2013 | Zhu | F16H 1/46 475/149 |
| 2014/0053333 A1* | 2/2014 | Krieg | A61B 6/0442 5/601 |
| 2014/0121674 A1* | 5/2014 | Staunton | A61N 1/0558 606/129 |
| 2014/0155215 A1* | 6/2014 | Rademakers | F16H 37/082 475/221 |
| 2014/0259412 A1* | 9/2014 | Shiery | A61G 7/0528 5/611 |
| 2014/0283648 A1 | 9/2014 | Severinsson | |
| 2014/0338480 A1* | 11/2014 | Wu | F16H 25/20 74/89.23 |
| 2014/0359942 A1* | 12/2014 | Koerth | A61G 1/02 5/611 |
| 2014/0371028 A1* | 12/2014 | Billmeyer | F16H 1/46 475/337 |
| 2015/0283924 A1* | 10/2015 | Boutouil | B60N 2/2252 297/362 |
| 2016/0047205 A1* | 2/2016 | Head | E21B 4/006 166/66.4 |
| 2016/0047446 A1* | 2/2016 | Hung | F16H 25/20 74/89.35 |
| 2016/0053858 A1 | 2/2016 | Brassitos et al. | |
| 2016/0059752 A1* | 3/2016 | Kishida | B60N 2/165 297/344.12 |
| 2016/0070247 A1* | 3/2016 | Ohishi | H02P 23/12 700/275 |
| 2016/0076624 A1* | 3/2016 | Uchihara | F16D 1/0858 310/83 |
| 2016/0095772 A1* | 4/2016 | Cole | A61G 7/001 5/618 |
| 2016/0106615 A1 | 4/2016 | Lee et al. | |
| 2016/0131229 A1* | 5/2016 | Hehenberger | F16H 3/72 475/80 |
| 2016/0156248 A1* | 6/2016 | Lueker | E06B 9/70 310/83 |
| 2016/0169327 A1* | 6/2016 | Fujita | B60N 2/2227 297/361.1 |
| 2016/0290440 A1 | 10/2016 | Chhour | |
| 2016/0302985 A1* | 10/2016 | Tessmer | A61G 7/012 |
| 2016/0348759 A1 | 12/2016 | McCloy | |
| 2017/0027597 A1* | 2/2017 | Walen | A61B 17/29 |
| 2017/0059002 A1* | 3/2017 | Sasaki | F16H 21/40 |
| 2017/0335944 A1 | 11/2017 | Nishimura | |
| 2018/0000670 A1 | 1/2018 | Bartley et al. | |
| 2018/0000672 A1 | 1/2018 | Heneveld, Jr. et al. | |
| 2018/0000673 A1 | 1/2018 | Bartley | |
| 2018/0000674 A1 | 1/2018 | Bartley | |
| 2018/0000675 A1 | 1/2018 | Heneveld, Jr. et al. | |
| 2020/0008991 A1 | 1/2020 | Wu | |

FOREIGN PATENT DOCUMENTS

| | | |
|---|---|---|
| FR | 2714135 A1 | 6/1995 |
| JP | 2003180762 A | 7/2003 |
| JP | 2017041210 A | 2/2017 |
| JP | 2017137888 A | 8/2017 |
| WO | 0117399 A1 | 3/2001 |

(56) References Cited

FOREIGN PATENT DOCUMENTS

| WO | 0117400 A1 | 3/2001 |
|---|---|---|
| WO | 2009019846 A1 | 2/2009 |

OTHER PUBLICATIONS

GMN Bearing USA, Functionality of the Sprag Clutch Design, available as least as early as Jun. 23, 2016; URL: https://www.gmnbt.com/sprag-clutch-design.htm.
Youtube, Renold Trapped Roller Clutch, published May 28, 2012; URL: https://www.youtube.com/watch?v=QjR7dimpSJA.
Moog, Aircraft Mechanical Actuators, available at least as early as Feb. 3, 2016; URL: http://www.moog.com/products/actuators-servoactuators/actuation-technologies/mechanical/aircraft-mechanical-actuators/.
YouTube, Hypocycloid Reducer, 100:1, Internal View, published Apr. 23, 2009; URL: https://www.youtube.com/watch?v=SH46bpe1cNA.
English language abstract and machine-assisted translation for JP2003180762 extracted from espacenet.com on Feb. 20, 2018; 9 pages.
English language abstract and machine-assisted English translation for CN205859053 extracted from espacenet.com database on Jul. 26, 2018, 12 pages.
English language abstract and machine-assisted English translation for FR 2 714 135 extracted from espacenet.com database on Jul. 26, 2018, 7 pages.
English language abstract and machine-assisted English translation for JP 2017-041210 extracted from PAJ database on Jul. 26, 2018, 54 pages.
English language abstract and machine-assisted English translation for JP 2017-137888 extracted from espacenet.com database on Jul. 26, 2018, 26 pages.
Crouzet Motors, "Crouzet Webpage", downloaded from http://motors.crouzet.com on Jul. 25, 2018, 3 pages.
Crouzet Motors, "80 W Motomate Planetary Gearboxes Part Number Made to Order Brochure", www.crouzet.com, Feb. 11, 2015, 4 pages.
Crouzet Motors, "Motors and Gearmotors Panorama Brochure", Jul. 2016, 5 pages.
Lin, Wang-Sung et al., "Design of a Two-Stage Cycloidal Gear Reducer with Tooth Modifications", Mechanism and Machine Theory, vol. 79, 2014, pp. 184-197.
Motion Solutions—RM Hoffman Division, "Nabtesco Motion Conrol Solutions—Cycloidal Gear Reducers Webpage", http://www.rmhoffman.com/nabtesco-motion-control.html, 2018, 4 pages.
Nabtesco, "High Performance Reduction Gears & Servo Actuators Brochure", 2018, 12 Pages.
Onvio LLC, "Zero Backlash Speed Reducers Brochure", 2005, pp. 1-19.
English language abstract and machine-assisted English translation of Equivalent JP 2009-036365 for WO 2009/019846 extracted from espacenet.com database on May 7, 2020, 13 pages.

* cited by examiner

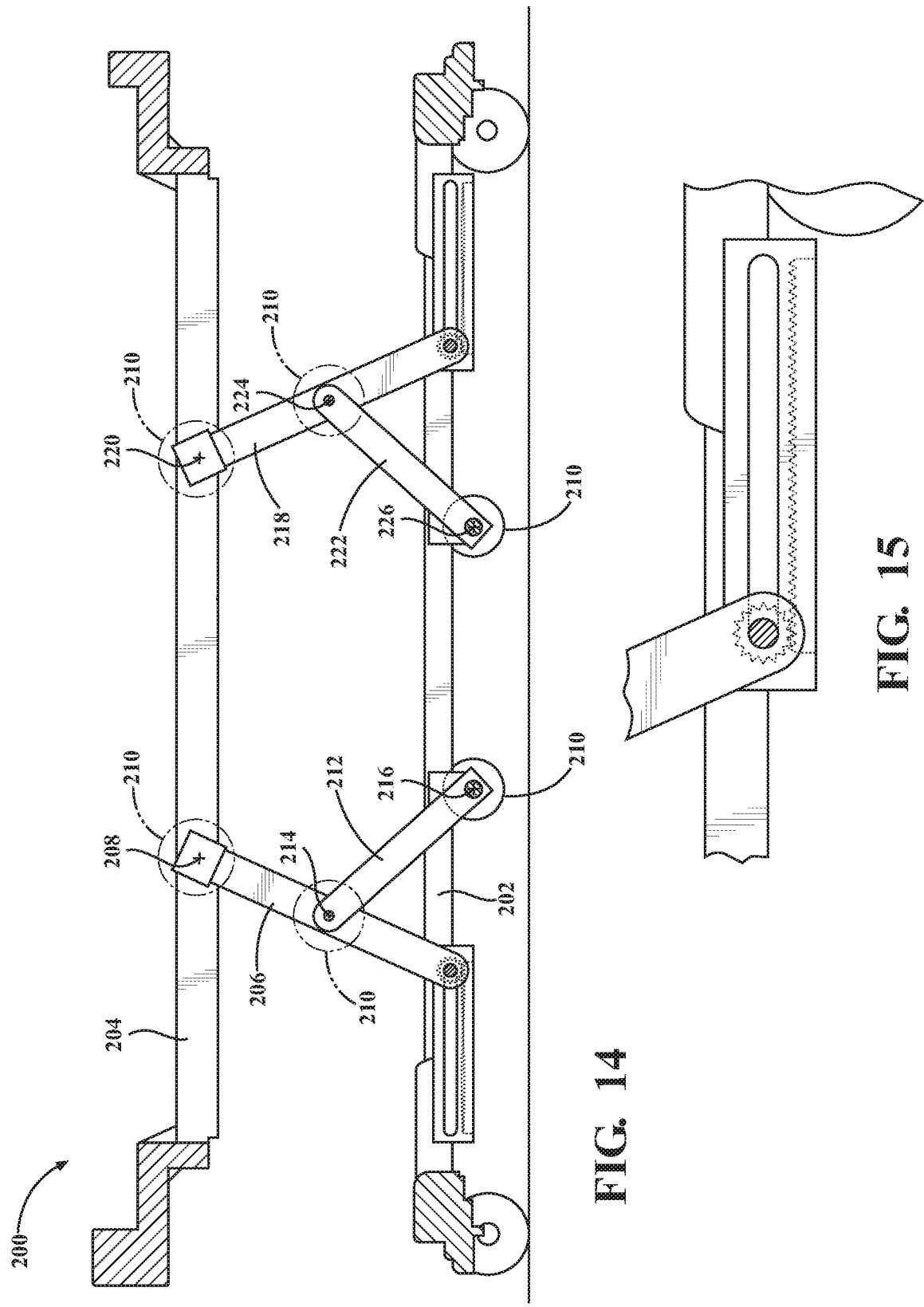

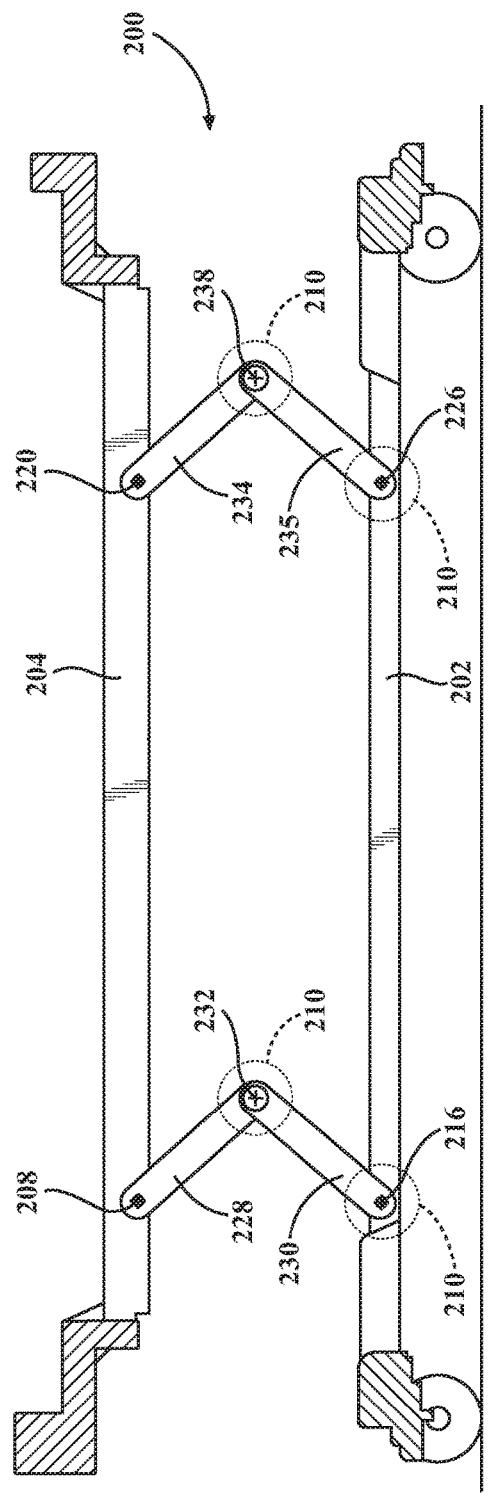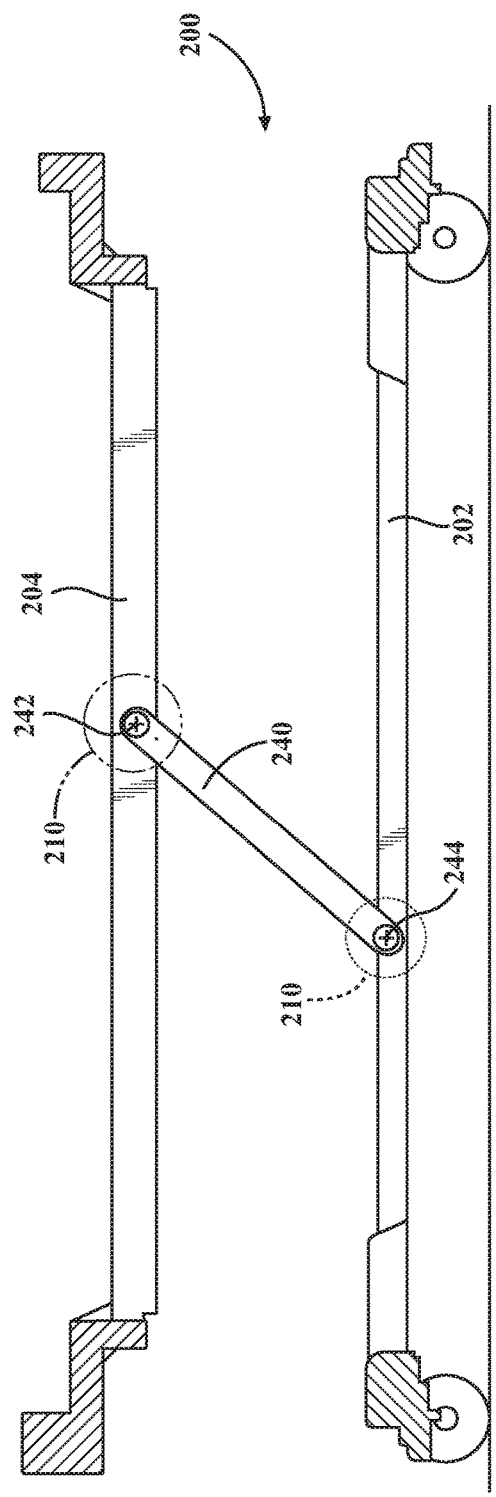

PATIENT SUPPORT SYSTEMS WITH HOLLOW ROTARY ACTUATORS

RELATED APPLICATIONS

This application claims priority to and the benefit of U.S. provisional patent application No. 62/356,362, filed on Jun. 29, 2016, the entire contents and disclosure of which are hereby incorporated by reference herein in their entirety.

BACKGROUND

Patient support systems facilitate care of patients in a health care setting. Patient support systems comprise patient support apparatuses such as, for example, hospital beds, stretchers, cots, and wheelchairs. Conventional patient support apparatuses comprise a base and a patient support surface upon which the patient is supported. Often, these patient support apparatuses also have movable members such as lift members, patient support deck sections, a bed length extension member, a bed width extension member, a wheel, a side rail, a footboard, or a headboard. One or more of these movable members may be moved using actuators. Typically, in order to move these movable members, linear actuators are used. Linear actuators take up a large and undesirable amount of space within or beneath the patient support apparatus. Rotary actuators may also be used to move the movable members. Rotary actuators often encounter difficulty preventing movable members from back driving and going into undesirable positions in certain situations, such as during a loss of power or when components break. Additionally, rotary actuators generally lack stiffness to give a caregiver or patient confidence in the structural integrity of the rotary actuator. Further, some rotary actuators may be difficult to package along with power cords, support structures, etc., into tight spaces on the patient support apparatus.

A patient support apparatus designed to overcome one or more of the aforementioned challenges is desired.

BRIEF DESCRIPTION OF THE DRAWINGS

FIG. 14 is an elevational view illustrating various locations the actuator may be coupled.

FIG. 15 is an elevational view illustrating a lift arm slidably coupled to a base of a patient support apparatus.

FIG. 16 is an elevational view illustrating one embodiment of where the actuator may be coupled.

FIG. 17 is an elevational view illustrating another embodiment of where the actuator may be coupled.

DETAILED DESCRIPTION

Figure 1:
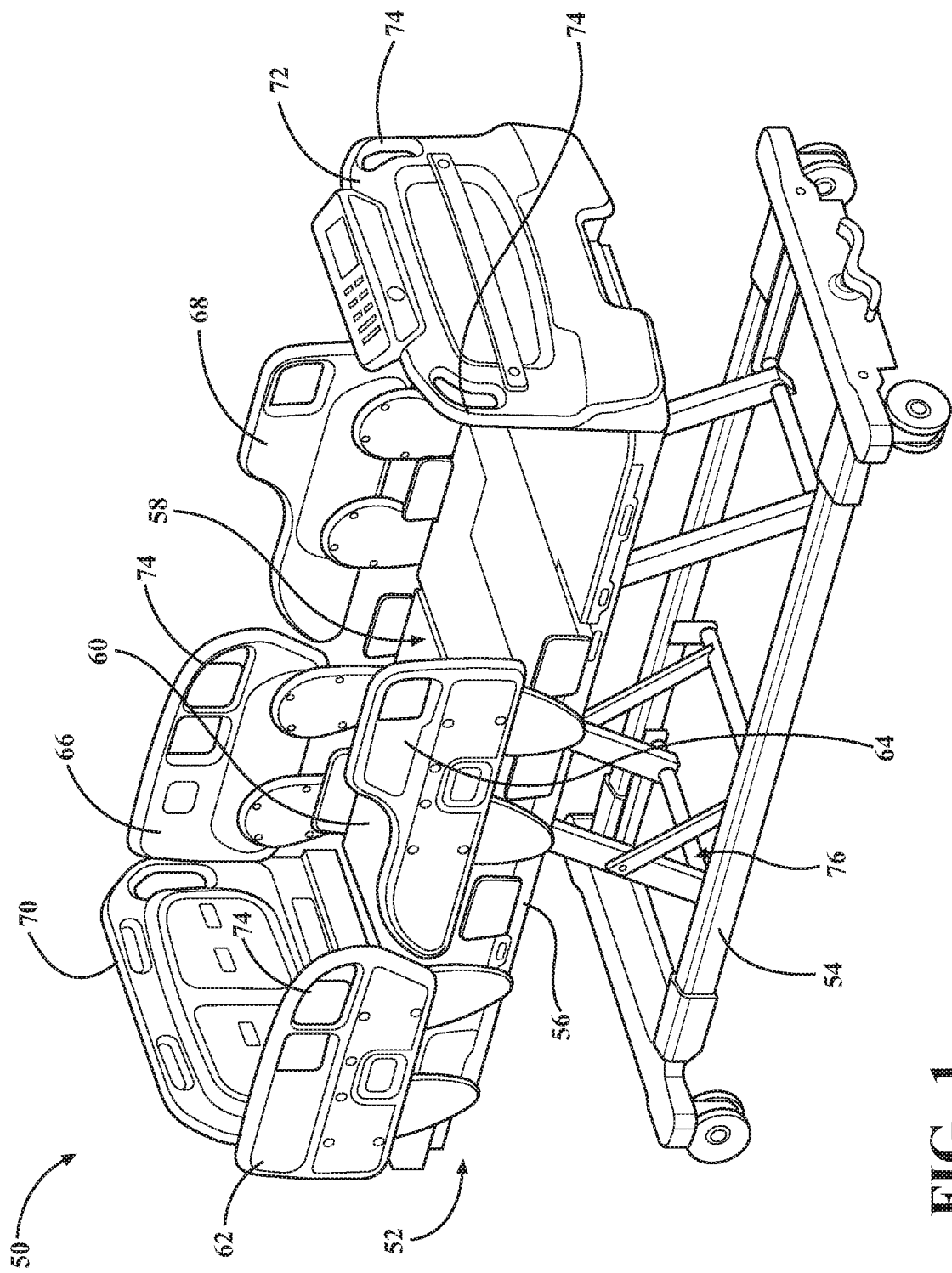
FIG. 1 is a perspective view of a patient support apparatus.

Referring to FIG. 1, a patient support system comprising a patient support apparatus 50 is shown for supporting a patient in a health care setting. The patient support apparatus 50 illustrated in FIG. 1 comprises a hospital bed. In other embodiments, however, the patient support apparatus 50 may comprise a stretcher, cot, table, wheelchair, or similar apparatus utilized in the care of a patient.

A support structure 52 provides support for the patient. The support structure 52 illustrated in FIG. 1 comprises a base 54 and an intermediate frame 56. The intermediate frame 56 is spaced above the base 54. The support structure 52 also comprises a patient support deck 58 disposed on the intermediate frame 56. The patient support deck 58 comprises several sections, some of which are pivotable relative to the intermediate frame 56, such as a fowler section, a seat section, a thigh section, and a foot section. The patient support deck 58 provides a patient support surface 60 upon which the patient is supported.

A mattress (not shown) is disposed on the patient support deck 58. The mattress comprises a secondary patient support surface upon which the patient is supported. The base 54, intermediate frame 56, patient support deck 58, and patient support surfaces 60 each have a head end and a foot end corresponding to designated placement of the patient's head and feet on the patient support apparatus 50. The construction of the support structure 52 may take on any known or conventional design, and is not limited to that specifically set forth above. In addition, the mattress may be omitted in certain embodiments, such that the patient rests directly on the patient support surface 60.

Side rails 62, 64, 66, 68 are coupled to the intermediate frame 56 and thereby supported by the base 54. A first side rail 62 is positioned at a right head end of the intermediate frame 56. A second side rail 64 is positioned at a right foot end of the intermediate frame 56. A third side rail 66 is positioned at a left head end of the intermediate frame 56. A fourth side rail 68 is positioned at a left foot end of the intermediate frame 56. If the patient support apparatus 50 is a stretcher or a cot, there may be fewer side rails. The side rails 62, 64, 66, 68 are movable between a raised position in which they block ingress and egress into and out of the patient support apparatus 50, a lowered position in which they are not an obstacle to such ingress and egress, and/or one or more intermediate positions therebetween. In still other configurations, the patient support apparatus 50 may not include any side rails.

A headboard 70 and a footboard 72 are coupled to the intermediate frame 56. In other embodiments, when the headboard 70 and footboard 72 are included, the headboard 70 and footboard 72 may be coupled to other locations on the patient support apparatus 50, such as the base 54. In still other embodiments, the patient support apparatus 50 does not include the headboard 70 and/or the footboard 72.

Caregiver interfaces 74, such as handles, are shown integrated into the footboard 72 and side rails 62, 64, 66, 68 to facilitate movement of the patient support apparatus 50 over floor surfaces. Additional caregiver interfaces 74 may be integrated into the headboard 70 and/or other components of the patient support apparatus 50. The caregiver interfaces 74 are graspable by the caregiver to manipulate the patient support apparatus 50 for movement. In other embodiments, the patient support apparatus 50 does not include caregiver interfaces 74.

Figure 2:
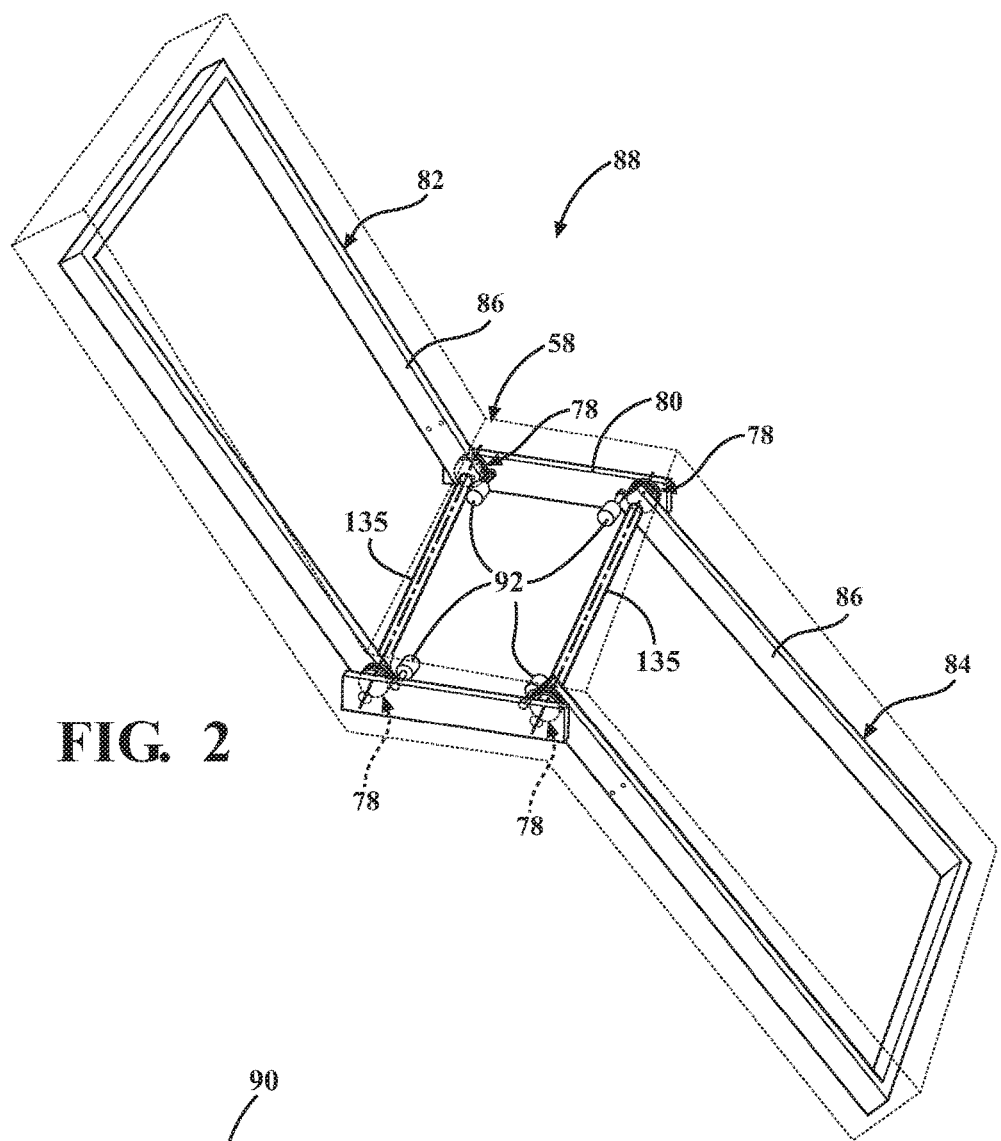
FIG. 2 is a perspective view of a patient support deck in a first position.

The patient support apparatus 50 may have numerous devices that comprise one or more movable members to perform a desired function. One such device is a lift device 76 that is coupled to the base 54 and the intermediate frame 56 to lift and lower the patient between minimum and maximum heights of the patient support apparatus 50, and/or intermediate positions therebetween. In the embodiment shown, the lift device 76 comprises a movable member in the form of a lift member for effectuating height changes of the patient support apparatus 50. Additionally, the patient support apparatus 50 may have other devices that comprise one or more movable members to perform a desired function such as a deck adjustment device configured to raise and/or lower one or more of the patient support deck sections. The movable members in these devices may be movable relative to another fixed or stationary member of the patient support apparatus 50 or movable relative to another member that also is movable. In some cases, the base 54 and/or the intermediate frame 56 may comprise the movable members. In these devices, one or more actuators 78 (see FIG. 2) are supported by the support structure 52. The actuators 78 are coupled to one or more of the movable members supported by the support structure 52. The movable member is any member supported by the support structure 52 and movable relative to any other member on the patient support apparatus 50, wherein the other member can include stationary or fixed members, or movable members.

Figure 3:
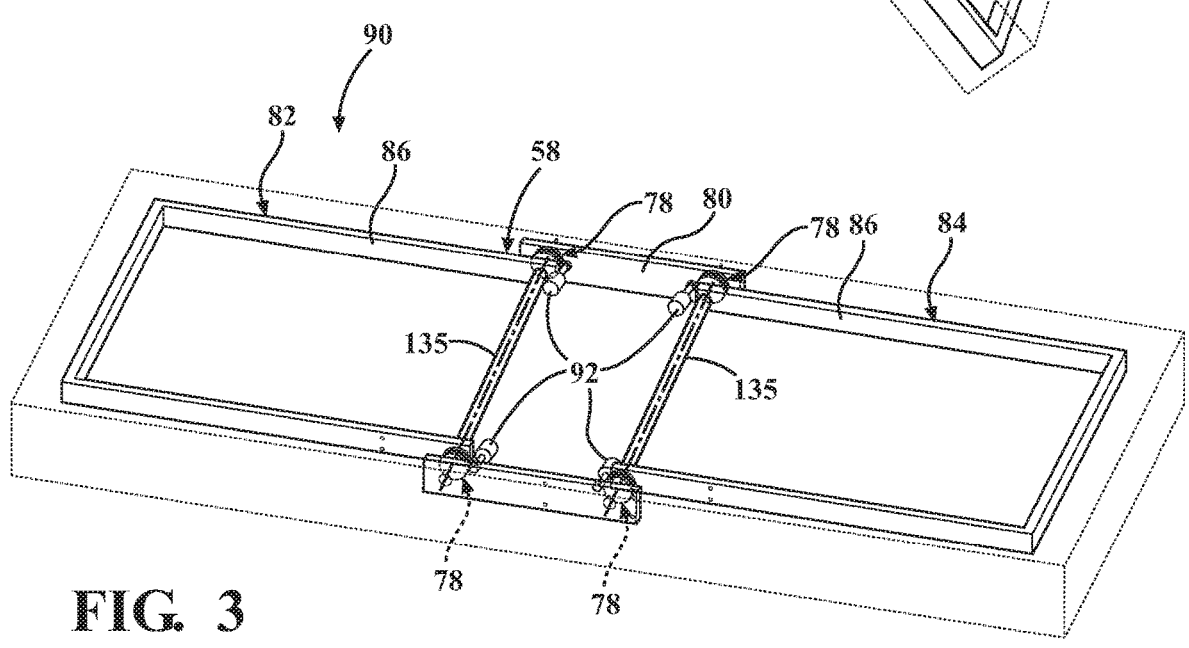
FIG. 3 is a perspective view of the patient support deck in a second position.

Although many different placements and uses of the actuators 78 are possible on a single patient support apparatus 50, only certain illustrative embodiments will be described in detail. In one embodiment shown in FIGS. 2-5, the patient support deck 58 comprises a seat section 80 supported by the base 54. The patient support deck 58 further comprises a fowler section 82 movably coupled to the seat section 80 and a foot section 84 movably coupled to the seat section 80 independent of the fowler section 82. In some embodiments, the seat section 80 is fixed to the intermediate frame 56. Actuators 78 are disposed between each of the fowler 82, foot 84, and seat 80 sections and are configured to move the fowler 82 and foot 84 sections relative to the seat section 80. In this embodiment, the fowler 82 and foot 84 sections comprise movable members 86 movable between at least a first position 88 shown in FIG. 2, a second position 90 shown in FIG. 3, and other positions therebetween. The fowler 82 and foot 84 sections may move concurrently or independently of each other. Four actuators 78 are shown, one for each movable member 86, but one actuator 78 could be employed to move a pair of the movable members 86, such that only one actuator 78 is employed to move each of the fowler section 82 and the foot section 84.

Figure 4:
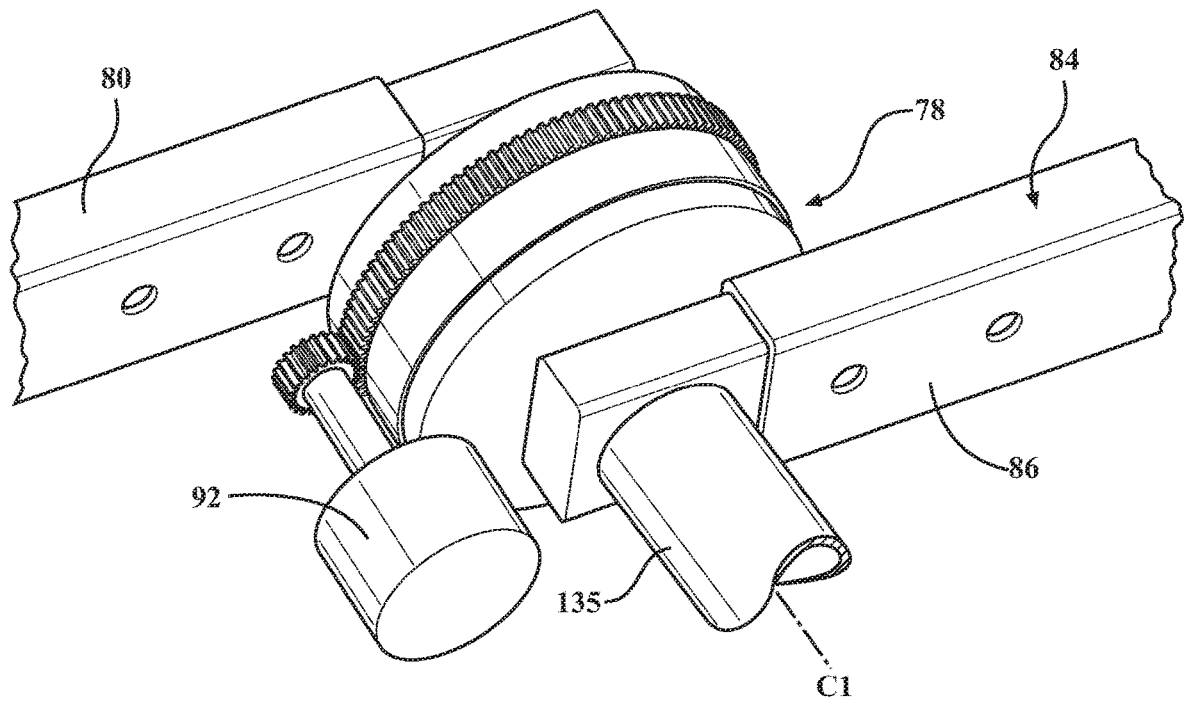
FIG. 4 is a perspective view of a hollow rotary actuator coupled to a seat section and a fowler section of the patient support deck.
Figure 5:
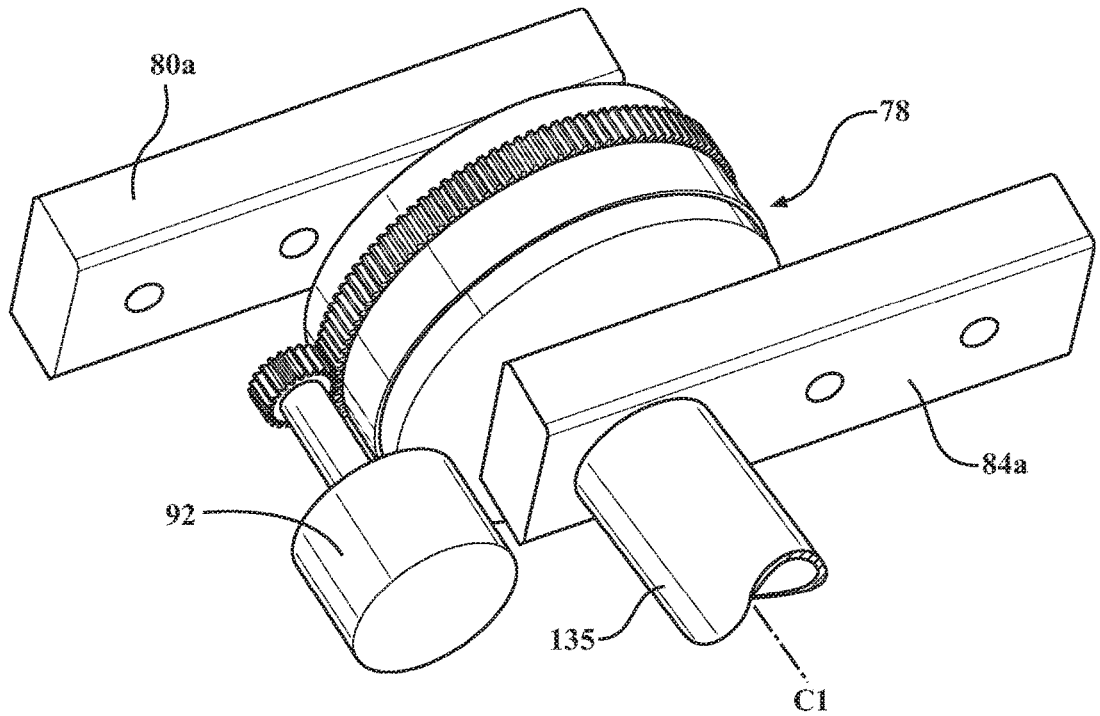
FIG. 5 is another perspective view of the hollow rotary actuator coupled to the seat section and the fowler section of the patient support deck.

As shown in FIGS. 4 and 5, only one of the actuators 78 between the foot section 84 and the seat section 80 is described herein for ease of description. In many of the embodiments disclosed below, the movable member 86 of the foot section 84 is described for convenience. The movable member 86 is coupled to the actuator 78. The actuator 78 comprises a motor 92. The motor 92 provides power for the actuator 78. The motor 92 may be an electric motor, a hydraulic motor, or any other motor adapted to provide power for the actuator 78. The actuator 78 shown in FIGS. 4 and 5 is arranged to pivot the foot section 84 relative to the seat section 80 about center axis C1. FIG. 4 shows the seat and foot sections 80, 84 and FIG. 5 shows arms 80a, 84a of the actuator 78 that are connected to the seat and foot sections 80, 84, respectively. At least one of the arms 80a, 84a is intended to articulate relative to the other to cause movement. In the embodiment shown, the arm 84a articulates relative to the arm 80a to move the foot section 84 relative to the seat section 80.

Figure 6:
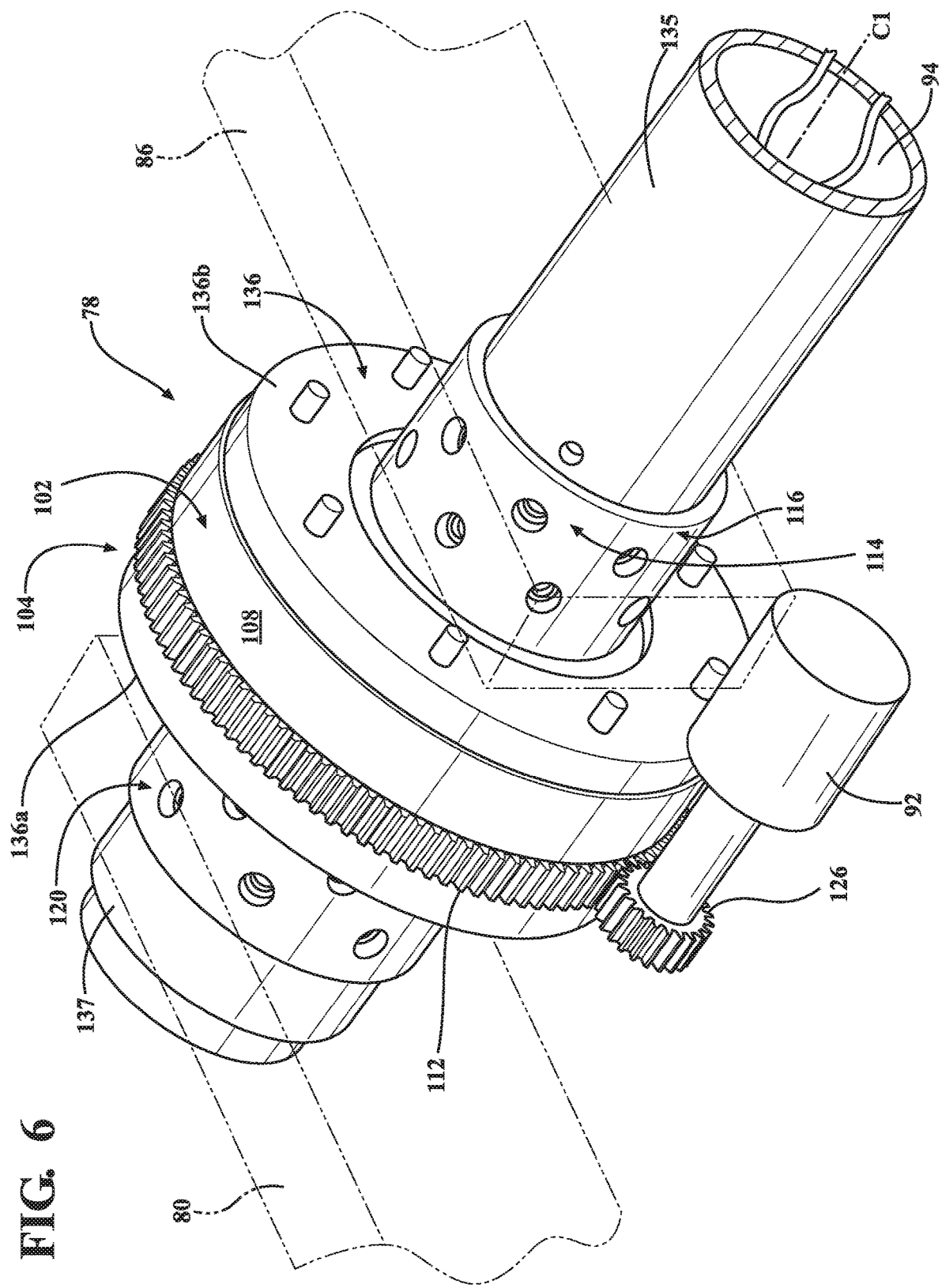
FIG. 6 is a perspective view of the hollow rotary actuator.
Figure 7:
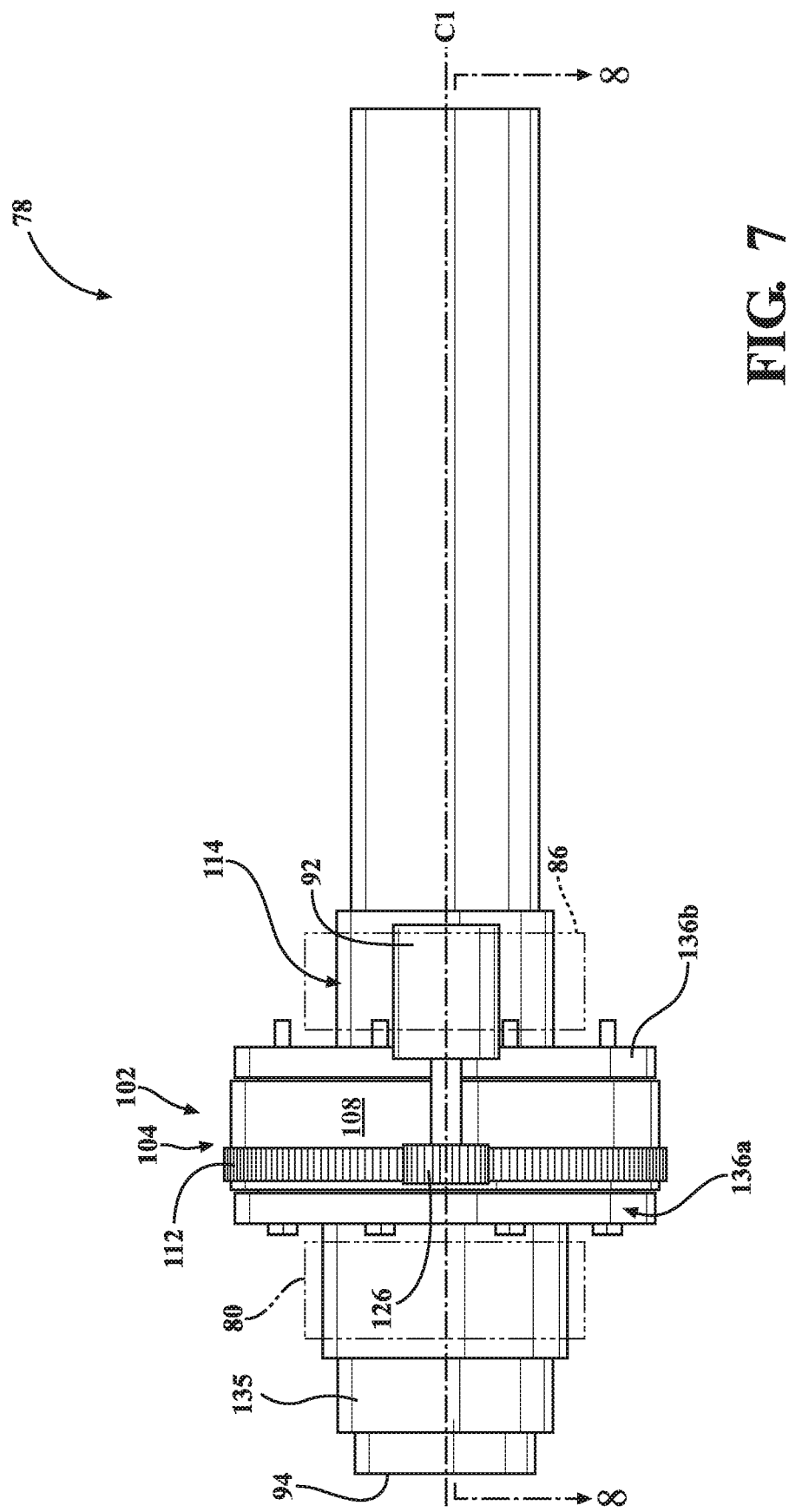
FIG. 7 is an elevational view of the hollow rotary actuator.
Figure 8:
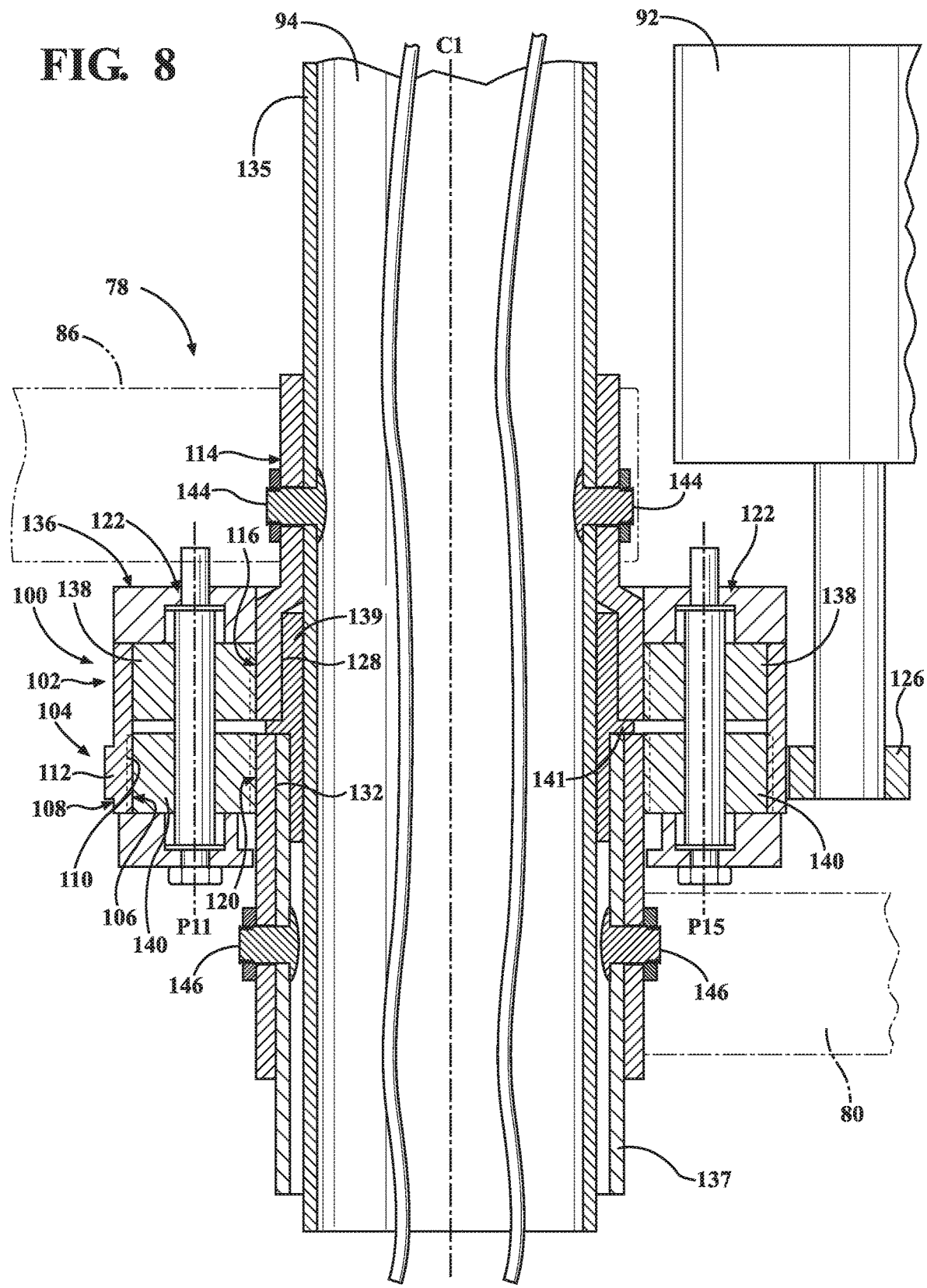
FIG. 8 is an elevational view illustrating a cross-section of FIG. 7.

With reference to FIGS. 6-8, the actuator 78 is a hollow actuator. The hollow actuator 78 is hollow and defines a through passage 94 (see FIG. 8) along the center axis C1. An elongate member is disposed within the through passage 94 and also along the center axis C1. In the embodiment shown, the elongate member is a tube 135. The hollow actuator 78 has many advantages resulting from its configuration described further below. One such advantage is the through passage 94 allowing cables, wires, tubes, support structures or other features offered by the patient support apparatus 50, either associated with the actuator 78 or completely separate from the actuator 78, to pass through and/or be placed within the actuator 78. In contrast, conventional rotary actuators have a motor, input gear, output gear, or a gear assembly that is disposed along the center axis of the rotary actuator. This configuration of the conventional rotary actuator requires the above mentioned features to be routed around the rotary actuator, which creates added packaging concerns within the patient support apparatus 50. Other advantages include using the elongate member as an axle to drive motion of one or more movable members 86, as described further below.

As shown in FIG. 8, the hollow actuator 78 comprises a gear assembly 100. The gear assembly 100 comprises an input member 102, an output member 114 connected to the movable member 86, and a gear arrangement operable between the input member 102 and the output member 114. The gear assembly 100 is hollow and defines the through passage 94. The input member 102 comprises a ring gear 104 rotatable about the center axis C1. The ring gear 104 defines an inner surface 106 and an outer surface 108. The ring gear 104 comprises internal teeth 110 continuously disposed about the center axis C1 on the inner surface 106 and external teeth 112 continuously disposed about the center axis C1 on the outer surface 108.

In one embodiment, the output member 114 comprises a first sun gear 116, hereinafter referred to as a moving sun gear 116, rotatable about the center axis C1. The gear arrangement comprises a second sun gear 120 disposed about the center axis C1 adjacent to the moving sun gear 116. The second sun gear 120, hereinafter referred to as a fixed sun gear, is fixed relative to the moving sun gear 116. The gear arrangement further comprises an array of planet gear clusters 122 disposed in meshing relationship with each of the ring gear 104, the moving sun gear 116, and the fixed sun gear 120.

It should be noted that in many of the figures described herein certain components of the hollow actuator 78 and its gear assembly 100 have been removed for convenience of description and ease of illustration. Additionally, bearings, bushings or other members used to rotatably support parts of the gear assembly 100 are shown in the figures, but not described in detail as their utilization and function are well understood by those skilled in the art.

Referring back to FIG. 6 in one embodiment, the motor 92 is fixed to a drive gear 126. The drive gear 126 is disposed in meshing relationship with the external teeth 112 of the ring gear 104. Power from the motor 92 translates to torque that is transmitted to the input member 102, through the gear arrangement, and results in rotation of the output member 114. In other embodiments, instead of the external teeth 112, the ring gear 104 could be driven via internal teeth, teeth located radially inwardly, belt drive, or other suitable driving arrangements. Various arrangements in which to apply torque from the motor 92 to the input member 102 are possible. The motor 92 can be mounted to any suitable component of the actuator 78 or other component of the patient support apparatus 50, such as the intermediate frame 56, seat section 80, or the like. In some embodiments, the motor 92 can be mounted to the movable member 86.

The fixed sun gear 120 is fixed about the center axis C1 and the moving sun gear 116 rotates relative to the fixed sun gear 120. In the embodiment shown, the fixed sun gear 120 is fixed to the seat section 80. It should be appreciated that the fixed sun gear 120 could be connected to another movable member 86 such that the actuator 78 is merely providing relative motion between two movable members 86.

In alternative embodiments, instead of the moving sun gear 116 being connected to the movable member 86, another part of the gear assembly 100 could be connected to the movable member 86 to move the movable member 86. In this case, the other part would be considered the output member 114, as the output member 114 comprises the part of the actuator 78 that is connected to the movable member 86. For instance, instead of connecting the moving sun gear 116 to the movable member 86, the moving sun gear 116 could be fixed to the seat section 80 and the fixed sun gear 120 could be connected to the movable member 86 to move the movable member 86 (e.g., making the fixed sun gear 120 the output member 114).

As shown in FIG. 8, the moving sun gear 116 comprises a first interior surface 128 defining a first cavity and the fixed sun gear 120 comprises a second interior surface 132 defining a second cavity that is in fluid communication with the first cavity. More specifically, the moving sun gear 116 and the fixed sun gear 120 are separately hollow and tubular. In the embodiment shown, the moving sun gear 116 and the fixed sun gear 120 are generally cylindrical in shape. The hollow tube 135 is disposed along the center axis C1 and received within the first and second cavities. The hollow tube 135 allows objects such as wires, cables, tubes, lines, and other objects to pass through the hollow tube 135 while the hollow actuator 78 is being driven by the motor 92.

In one embodiment shown in FIG. 8, the hollow actuator 78 comprises a hollow spacer tube 139 disposed along the center axis C1 within the through passage 94 between the hollow tube 135 and the moving 116 and fixed 120 sun gears. The hollow spacer tube 139 comprises a flange 141 extending outwardly relative to the center axis C1 disposed between the moving 116 and fixed 120 sun gears to space the moving sun gear 116 from the fixed sun gear 120. The flange 141 separates teeth of the moving sun gear 116 from teeth of the fixed sun gear 120. The hollow actuator 78 also comprises an outer tube 137 disposed between the spacer tube 139 and the fixed sun gear 120.

In one embodiment shown in FIG. 8, the moving sun gear 116 comprises moving sun gear fasteners 144 and the fixed sun gear 120 comprises fixed sun gear fasteners 146. In the embodiment shown, the moving sun gear fasteners 144 couple the tube 135 to the moving sun gear 116 and the fixed sun gear fasteners 146 couples the outer tube 137 to the fixed sun gear 120. In this configuration, the tube 135 is configured to rotate with the moving sun gear 116 relative to the fixed sun gear 120 and relative to the outer tube 137. In alternative embodiments, the fixed sun gear fasteners 146 couple the tube 135 to the fixed sun gear 120 and the moving sun gear fasteners 144 are eliminated so that the moving sun gear 116 is free to move relative to both the fixed sun gear 120 and the tube 135. In still other embodiments, the tube 135 is fastened to neither the moving sun gear 116 nor the fixed sun gear 120 and is free to move within the moving sun gear 116 and/or the fixed sun gear 120.

In one embodiment, returning briefly to FIGS. 2 and 3, the tube 135 is shared between multiple hollow actuators 78 to allow the patient support apparatus 50 to route cables, wires, tubes, support structures or other features offered by the patient support apparatus 50 from one side to another of the patient support apparatus 50 avoiding pinching of the features and limiting movement of the features during actuation of the hollow actuators 78.

Figure 9:
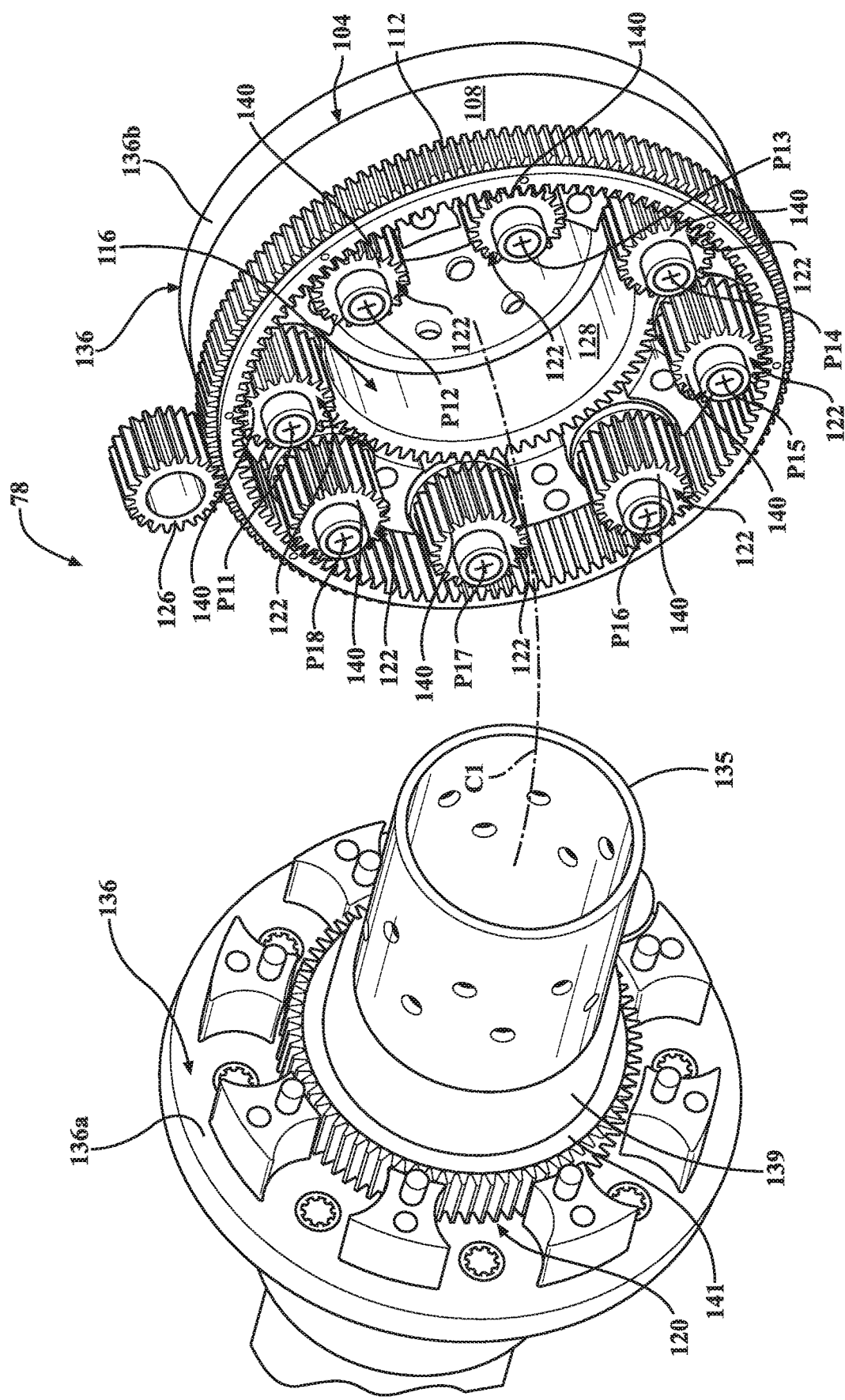
FIG. 9 is a perspective view of a carrier for the hollow rotary actuator and an array of planet gear clusters.

As shown in FIG. 9, the hollow actuator 78 comprises a carrier 136 (removed in FIG. 10) rotatable about the center axis C1. The carrier 136 is a housing which retains the array of planet gear clusters 122 in meshing relationship with each of the ring gear 104, the moving sun gear 116, and the fixed sun gear 120 as the carrier 136 rotates about the center axis C1. In some embodiments, the carrier 136 comprises multiple components coupled together to form a single housing for ease in assembling the hollow actuator 78. In other embodiments, the carrier 136 is one piece. In the embodiment shown, the carrier 136 comprises end flanges 136a, 136b with the planet gear clusters 122 rotatably supported by the carrier 136 between the end flanges 136a, 136b. The ring gear 104 is disposed for rotational movement relative to the carrier 136 between the end flanges 136a, 136b such that the ring gear 104 has an outer diameter similar in dimension to the end flanges 136a, 136b.

Figure 10:
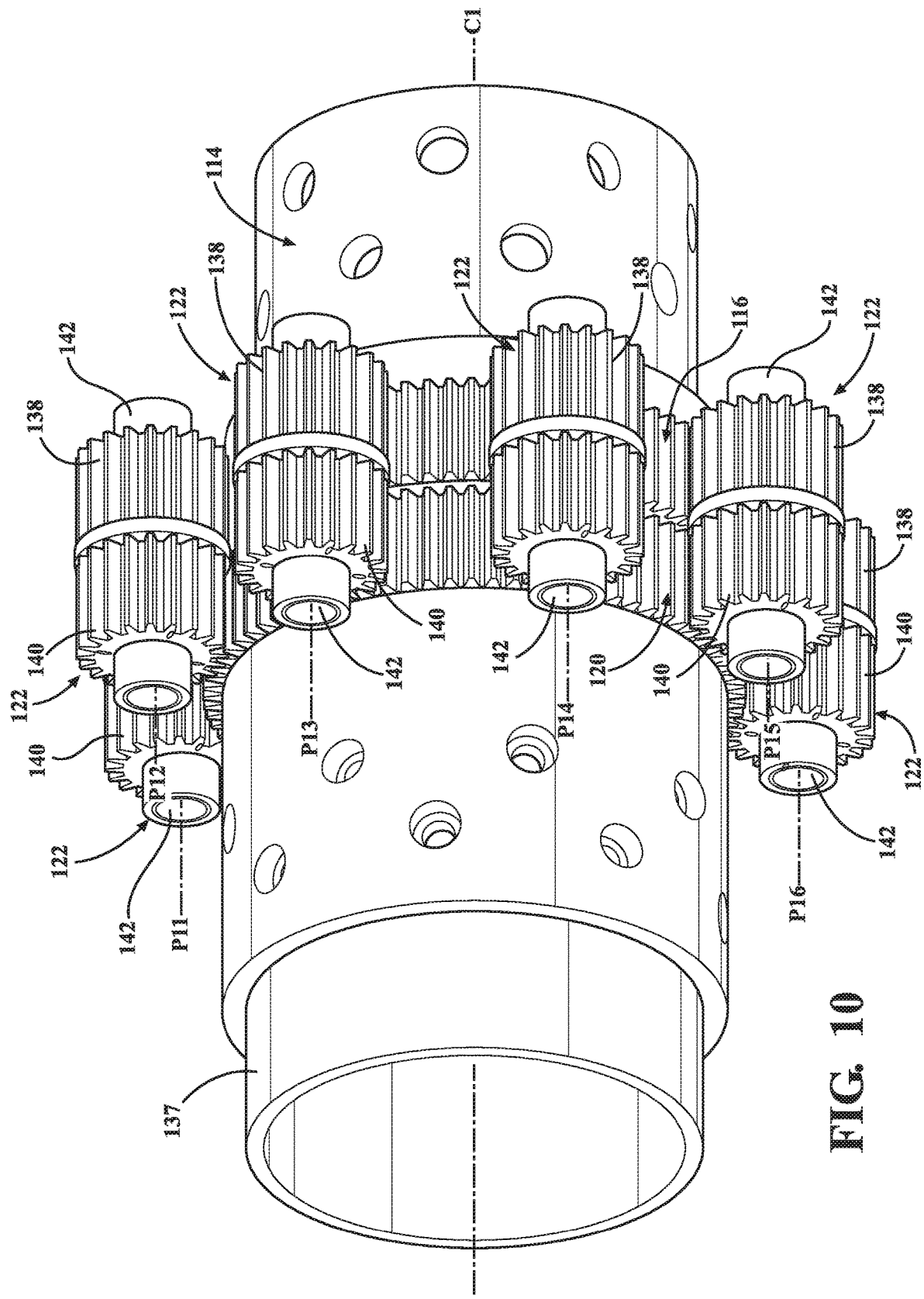
FIG. 10 is a perspective view of the array of planet gear clusters and sun gears.
Figure 11:
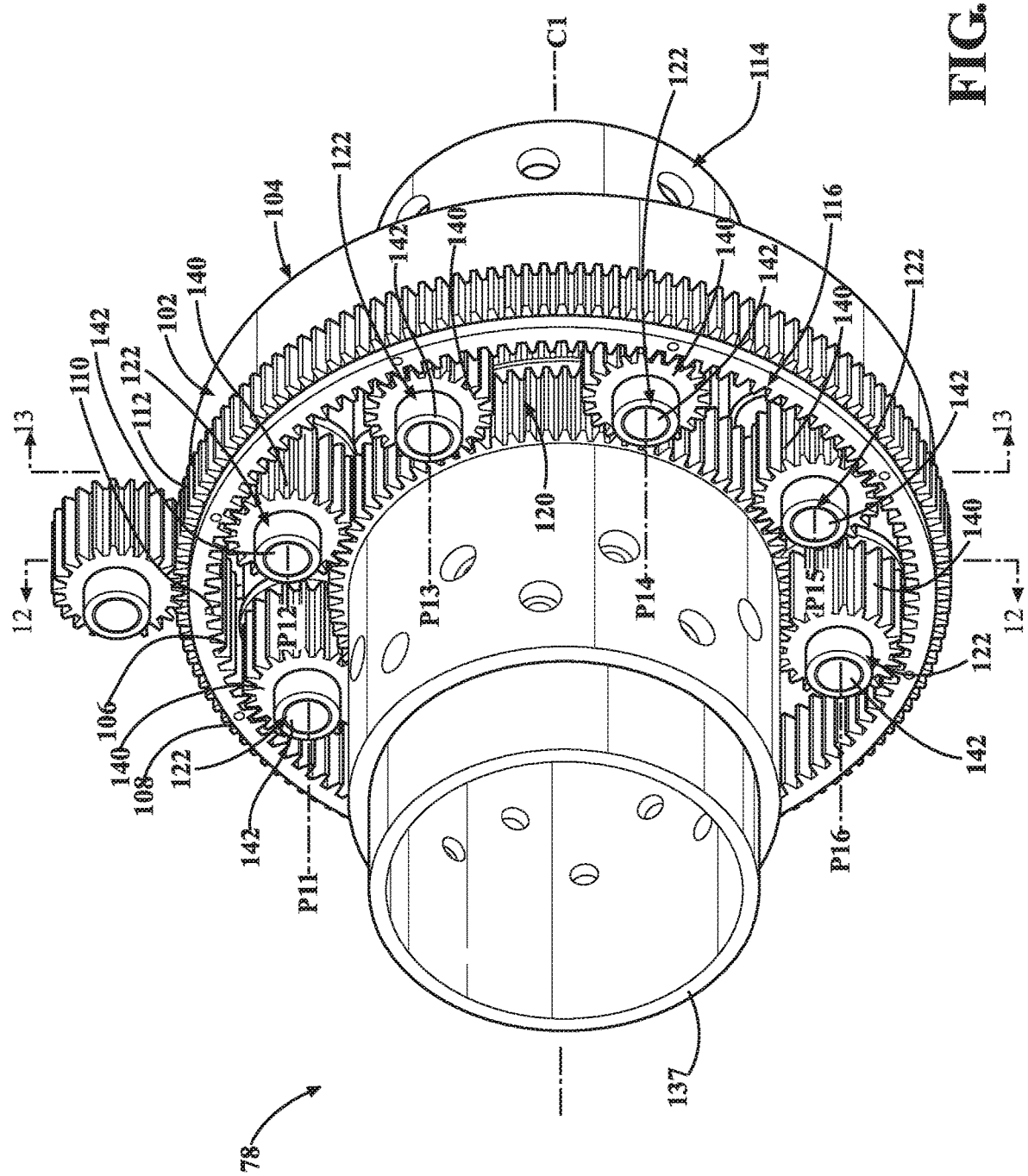
FIG. 11 is a perspective view of the array of planet gear clusters, the sun gears and a ring gear.

As shown in FIGS. 9 and 10, the array of planet gear clusters 122 comprises first planet gears 138 spaced from each other and rotatable in the carrier 136 about respective planet gear axes P11, P12, P13, P14, P15, P16, P17, P18. Each of the first planet gears 138 is disposed in direct meshing relationship with the moving sun gear 116 such that the first planet gears 138 revolve about the center axis C1 during actuation. In many embodiments, the planet gear axes P11, P12, P13, P14, P15, P16, P17, P18 are parallel with the center axis C1.

The array of planet gear clusters 122 comprises second planet gears 140 fixed to the first planet gears 138 to rotate with the first planet gears 138 about the planet gear axes P11, P12, P13, P14, P15, P16, P17, P18 and to revolve with the first planet gears 138 about the center axis C1 during actuation. Each of the second planet gears 140 is disposed in direct meshing relationship with the fixed sun gear 120.

Figure 12:
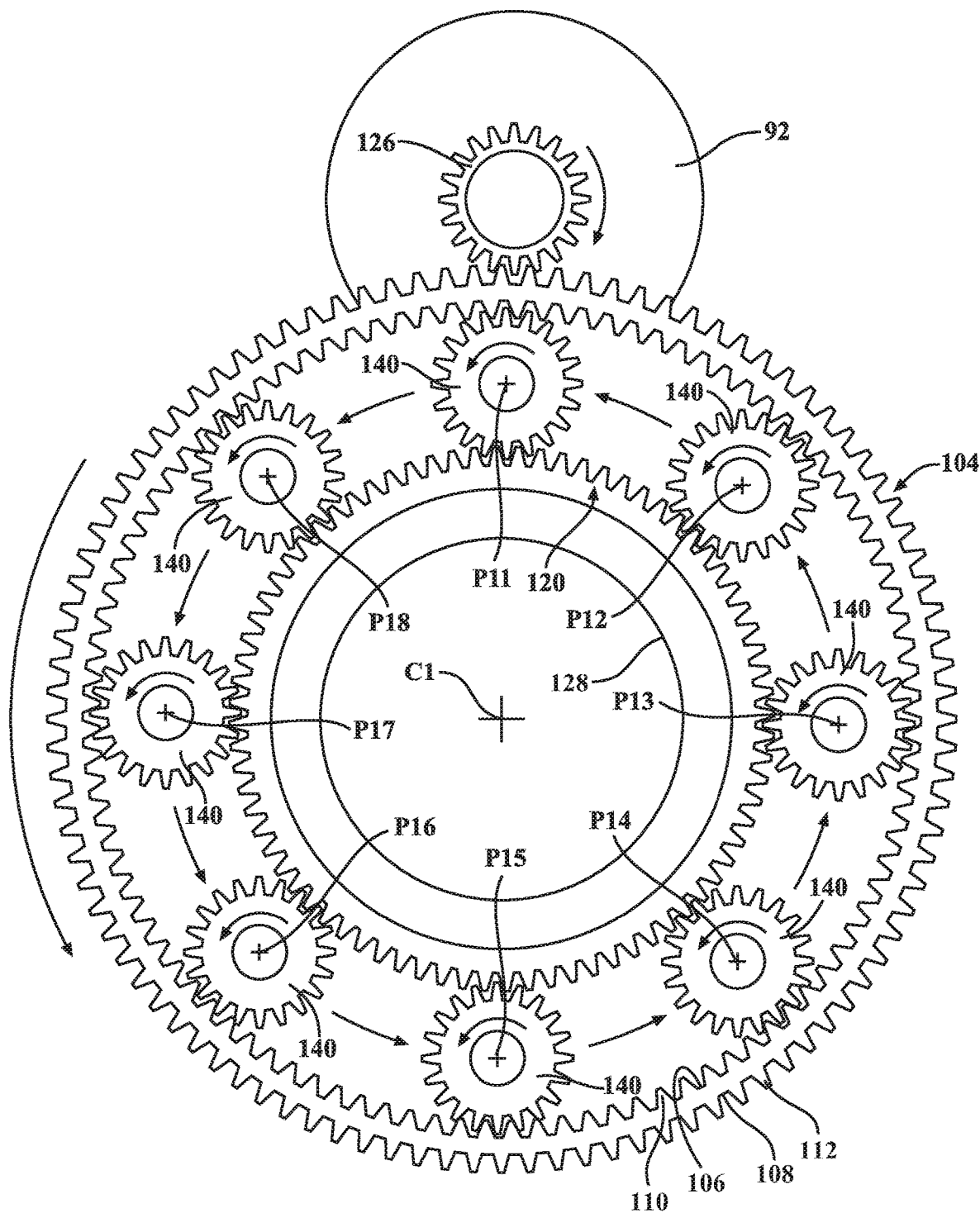
FIG. 12 is an elevational view of a cross-section of FIG. 11 showing a set of planet gears in the array of planet gear clusters.
Figure 13:
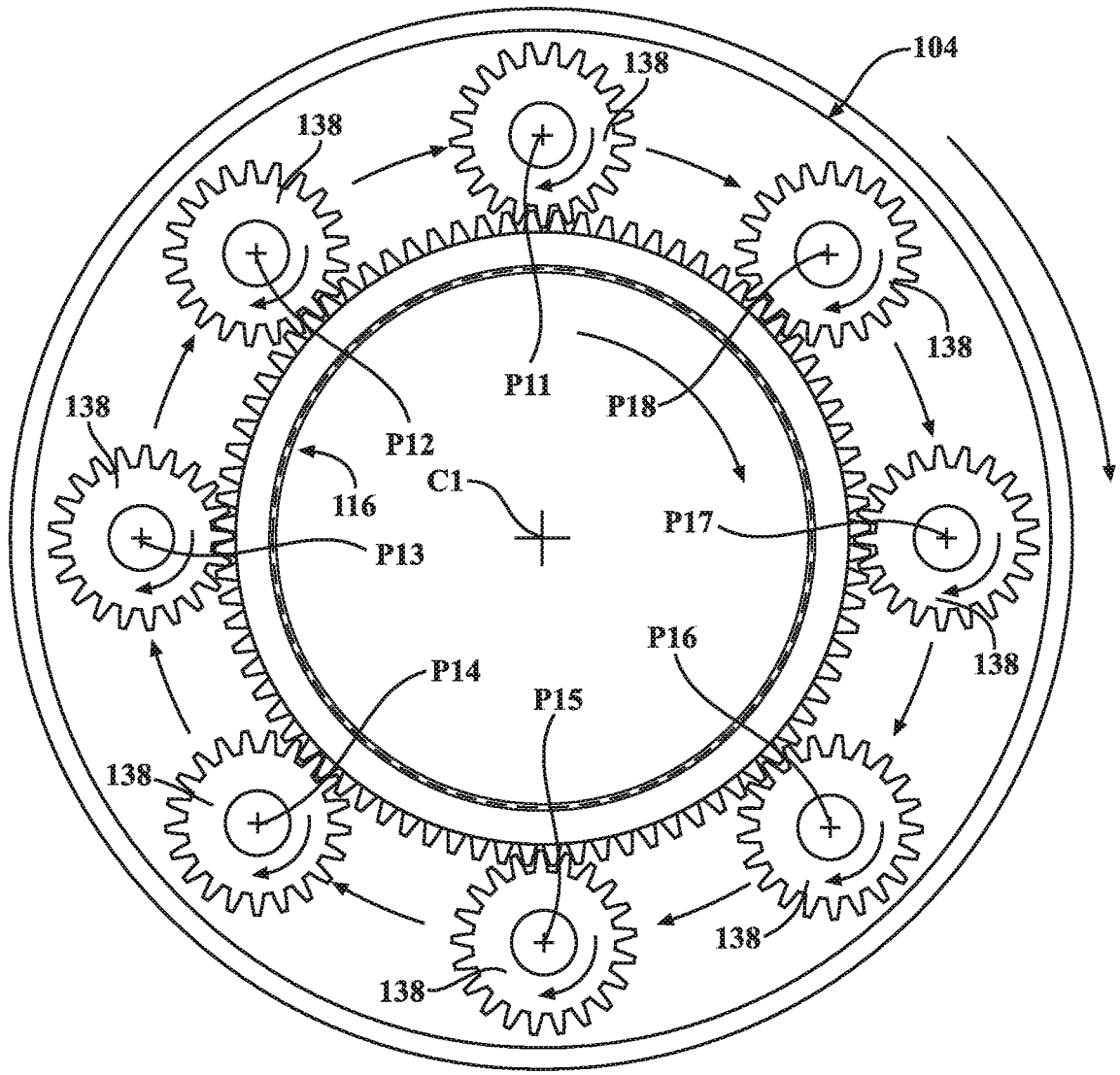
FIG. 13 is an elevational view of another cross-section view of FIG. 11 showing another set of planet gears in the array of planet gear clusters.

As shown in FIGS. 12 and 13, the array of planet gear clusters 122 comprises eight first planet gears 138 and eight second planet gears 140. In alternative embodiments, the array of planet gear clusters 122 comprises nine or more of the first planet gears 138 and nine or more of the second planet gears 140. In other embodiments, the array of planet gear clusters 122 comprises seven or fewer first planet gears 138 and seven or fewer second planet gears 140. The planet gears 138, 140 are all supported for rotation within the carrier 136. Further, by virtue of being rotatably supported in the carrier 136, the carrier 136 revolves together with the planet gears 138, 140 about the center axis C1 during actuation.

The internal teeth 110 of the ring gear 104 are disposed in direct meshing relationship with the second planet gears 140. In alternative embodiments, the internal teeth 110 are disposed in direct meshing relationship with the first planet gears 138. In other embodiments, the internal teeth 110 are disposed in direct meshing relationship with the first planet gears 138 and the second planet gears 140.

Referring back to FIG. 10, planet gear shafts 142 are disposed along the planet gear axes P11, P12, P13, P14, P15, P16, P17, P18 and are used to couple the first 138 and second 140 planet gears together. Each shaft 142 defines a length and may comprise a spline disposed on an exterior surface of the shaft 142. Each spline extends along a partial length of each shaft 142 to align each of the first 138 and second 140 planet gears in a desired rotational orientation relative to each other. In alternative embodiments, each spline only aligns one of the first 138 and second 140 planet gears in a desired rotational orientation and the remaining first 138 or second 140 planet gears are aligned to each shaft 142 in an alternative method including, but not limited to, welding, press-fitting, or use of a pin. In still other embodiments, each of the shaft 142, first planet gear 138 and second planet gear 140 are integrated such that they collectively form a single component.

Referring to FIG. 12, each of the second planet gears 140 comprises a number of teeth, referenced as $N_{SP}$. The fixed sun gear 120 comprises a number of teeth, referenced as $N_{FS}$. Referring to FIG. 13, each of the first planet gears 138 comprises a number of teeth, referenced as $N_{FP}$. The moving sun gear 116 comprises a number of teeth, referenced as $N_{MS}$. A first ratio of $N_{FP}/N_{MS}$ is different from a second ratio of $N_{SP}/N_{FS}$. This difference between the first ratio and the second ratio enables the hollow actuator 78 to provide motion (or relative motion) of the movable member 86. In the embodiments shown, the gear assembly 100 enables rotation of the moving sun gear 116 relative to the fixed sun gear 120 if the first ratio is different from the second ratio.

In one embodiment, $N_{FP}$ equals 21, $N_{MS}$ equals 80, $N_{SP}$ equals 20, and $N_{FS}$ equals 76. Thus, each of the first planet gears 138 has more teeth than each of the second planet gears 140. In other embodiments, each of the second planet gears 140 has more teeth than each of the first planet gears 138, or the same number of teeth. In the embodiment shown, the moving sun gear 116 has more teeth than the fixed sun gear 120 e.g., four more teeth. In other embodiments the moving sun gear 116 has one, two, or three more teeth than the fixed sun gear 120. In other embodiments, the fixed sun gear 120 has more teeth than the moving sun gear 116, or the same number of teeth, such as in cases in which the first 138 and second 140 planet gears have different numbers of teeth. It should be appreciated that the differences in the number of teeth between the moving sun gear 116 and the fixed sun gear 120 or between the first planet gears 138 and the second planet gears 140 could widely vary, depending on the application and specific configuration of the gear assembly 100 desired.

The first 138 and second 140 planet gears couple the moving sun gear 116 to the fixed sun gear 120. Each of the first planet gears 138 has a first planet gear diameter (radius for determining diameter is measured from a center of the planet gear to an imaginary circumference defined by the furthermost points on the teeth of the planet gear) and each of the second planet gears 140 has a second planet gear diameter. In one embodiment, the second planet gear diameter is different than the first planet gear diameter. In another embodiment, the diameters of the first 138 and second 140 planet gears are the same. In other words, the pinion radius of the first planet gears 138 may be the same as or different than the pinion radius of the second planet gears 140.

The first planet gear 138 has a physical configuration different from the second planet gear 140 to enable the planet gears 138, 140 to be placed on the same planet gear axis at the same distance from the center axis C1 while maintaining desired interfacing with their respective sun gears 116, 120. The difference in configuration may be attributed to one of tooth geometry, gear diameter, number of teeth, profile shift, extended/reduced addendums or dedendums, tooth depth, trichoid design, tooth alignment between gears, or any other physical quality a gear may have, and any combination thereof.

In one embodiment, the movable member 86 is coupled to the moving sun gear 116 and the seat section 80 is fixed to the fixed sun gear 120. In this manner, the hollow actuator 78 accommodates movement of the movable member 86 relative to the seat section 80 about the center axis C1.

Referring to FIGS. 12 and 13, the motor 92 is configured to rotate the ring gear 104 about the center axis C1 via the drive gear 126, which rotates the first 138 and second 140 planet gears about their respective planet gear axes P11, P12, P13, P14, P15, P16, P17, P18 and revolves the array of planet gear clusters 122 (and by extension the carrier 136) about the center axis C1, which rotates the moving sun gear 116 relative to the fixed sun gear 120 about the center axis C1 and moves the movable member 86 relative to the base 54. The hollow actuator 78 is forward driven in this configuration. The rotation of the moving sun gear 116 relative to the fixed sun gear 120 results from different ratios between the first planet gear 138 and the moving sun gear 116, and the second planet gear 140 and the fixed sun gear 120.

The hollow actuator 78 is back driven when a load is applied externally to the movable member 86, which creates torque in opposition to the driving torque that, if not checked, would otherwise rotate (in an opposite direction to the forward driving direction) the moving sun gear 116 relative to the fixed sun gear 120, which consequently rotates the first 138 and second 140 planet gears about their respective planet gear axes P11, P12, P13, P14, P15, P16, P17, P18 and revolves the array of planet gear clusters 122 about the center axis C1, which rotates the ring gear 104 about the center axis C1.

The hollow actuator 78 has a forward drive efficiency and a back drive efficiency. The forward drive efficiency defines a proportion of forward drive output power to forward drive input power when the forward drive input power is applied to the input member 102 (e.g., the ring gear 104) by the motor 92 and the forward drive output power is available at the output member 114 (e.g., moving sun gear 116) in response to the forward drive input power.

The back drive efficiency defines a proportion of back drive output power to back drive input power wherein the back drive input power is applied to the output member 114 and the back drive output power is available at the input member 102 in response to the back drive input power. Generally, in complex gear trains, lower forward drive efficiency results in lower back drive efficiency.

In this embodiment, the forward drive efficiency is greater than the back drive efficiency. In one embodiment, the forward drive efficiency is 0.5 or less and the back drive efficiency is 0.0 or less. When this occurs, the hollow actuator 78 may not be back driven. Said differently, when the back drive efficiency is 0.0 or less, the hollow actuator 78 does not permit rotation of the moving sun gear 116 in either direction unless forward driven. The hollow actuator 78 is designed to have efficiency losses such that the forward drive efficiency is less than 0.5 and the back drive efficiency is less than 0.0.

Providing the hollow actuator 78 with back drive efficiency of 0.0 or less has many advantages. One advantage is regardless of power (e.g. torque caused by external loads) applied to the output member 114, the input member 102 will not rotate in response. This advantage is particularly beneficial for patient support apparatus applications. Returning to the foot section 84 embodiment as an example, movement of the foot section 84 is at least partially dependent on power being supplied to the motor 92 rather than as a result of a load being applied to the foot section 84 such as via weight of a patient on the foot section 84 or the foot section 84 being manipulated by a patient as a result of sudden force applied to the foot section 84. As another example, in the event the patient support apparatus 50 is being transported and the foot section 84 collides with an external object, the foot section 84 would not move from the position the foot section 84 was in prior to the collision. Other advantages include not requiring an external braking solution to be coupled to the hollow actuator 78 or requiring the motor 92 to have an internal braking solution. Either of the external braking solution and the internal motor braking solution may be necessary in the event that the hollow actuator 78 is back drivable. It should be appreciated that brakes could still be employed as a redundant safety mechanism.

As previously described, the patient support apparatus 50 may have numerous devices that comprise one or more movable members that need to be moved to perform a desired function. The hollow actuator 78 described can be used to cause movement of such movable members. Although the hollow actuator 78 could be used in many different types of devices present on the patient support apparatus 50, only a few, non-limiting, additional examples are illustrated for convenience.

Referring to FIGS. 14-19, the actuator 78 described above may be used for application in a lift system 200. The actuator 78 is hereinafter referenced as actuator 210. The lift system 200 is coupled to a base 202 and an intermediate frame 204 and moves the intermediate frame 204 relative to the base 202 between a raised position, a lowered position, and one or more positions therebetween.

In one embodiment shown in FIG. 14, the lift system 200 comprises a head end lifting arm 206 pivotally coupled to the intermediate frame 204 at a head end joint 208 and slidably coupled to the base 202. The lift system 200 further comprises a first timing arm 212 pivotally coupled to the head end lifting arm 206 at a head end arm joint 214 and pivotally coupled to the base 202 at a head end base joint 216. The lift system 200 additionally comprises a foot end lifting arm 218 pivotally coupled to the intermediate frame 204 at a foot end joint 220 and slidably coupled to the base 202. The lift system 200 further comprises a second timing arm 222 pivotally coupled to the foot end lifting arm 218 at a foot end arm joint 224 and pivotally coupled to the base 202 at a foot end base joint 226. It should be appreciated that although reference is made to only a single head end lifting arm 206, a single foot end lifting arm 218, a single first timing arm 212, and a single second timing arm 222, multiples of such arms could also be employed.

In this embodiment, two actuators 210 are utilized for raising and lowering the intermediate frame 204 relative to the base 202. More specifically, one actuator 210 is coupled to one of the head end joints 208, 214, 216 and another actuator 210 is coupled to one of the foot end joints 220, 224, 226.

In another embodiment, more than two actuators 210 are coupled to the head end joints 208, 214, 216 and the foot end joints 220, 224, 226 as long as at least one actuator 210 is coupled to one of the head end joints 208, 214, 216 and at least one actuator 210 is coupled to one of the foot end joints 220, 224, 226.

In one embodiment, one actuator 210 is coupled to the head end joint 208 and another actuator 210 is coupled to the foot end joint 220. The head end lifting arm 206 is a movable member and the actuator 210 coupled to the head end joint 208 drives movement of the head end lifting arm 206 relative to the intermediate frame 204. The foot end lifting arm 218 is another movable member and the actuator 210 coupled to the foot end joint 220 drives movement of the foot end lifting arm 218 relative to the intermediate frame 204. The actuator 210 coupled to the head end joint 208 and the actuator 210 coupled to the foot end joint 220 operate in concert to raise and lower the intermediate frame 204 relative to the base 202 so that the intermediate frame 204 remains horizontal and parallel with a floor surface. In an alternative embodiment, one of the actuators 210 may drive movement of one of the movable members to raise and lower either the head end or the foot end such that the intermediate frame 204 does not remain horizontal with the floor surface. In further embodiments, the actuators 210 can be driven at different speeds to provide Trendelenburg or reverse Trendelenburg movement.

Figure 14B:
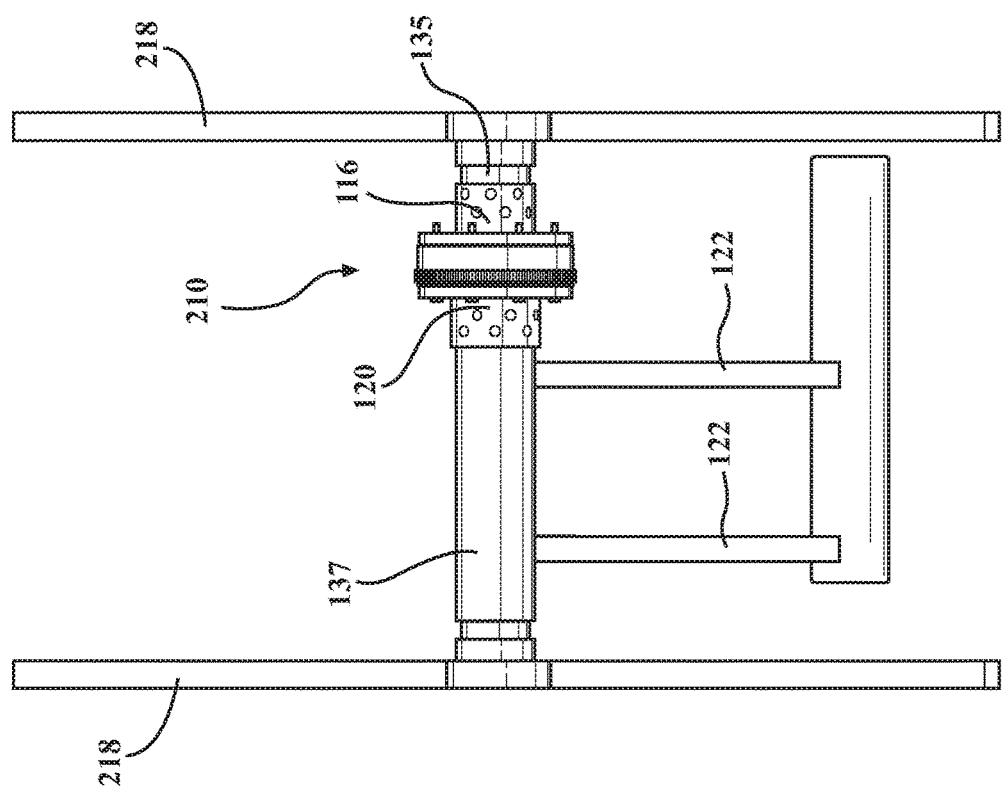
FIG. 14B is another perspective view of the lift arm arrangement of FIG. 14A.
Figure 14A:
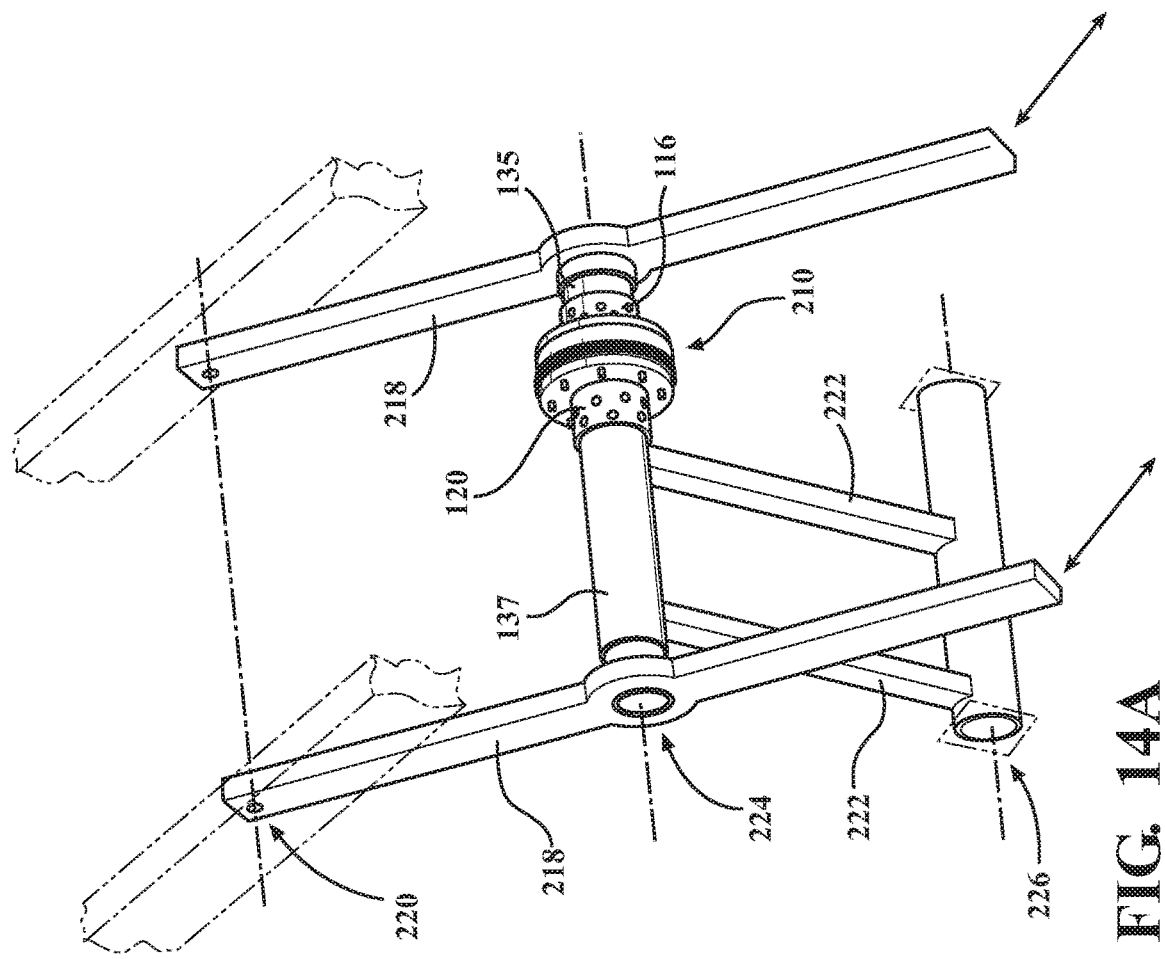
FIG. 14A is a perspective view of a lift arm arrangement for the patient support apparatus.
Figure 14C:
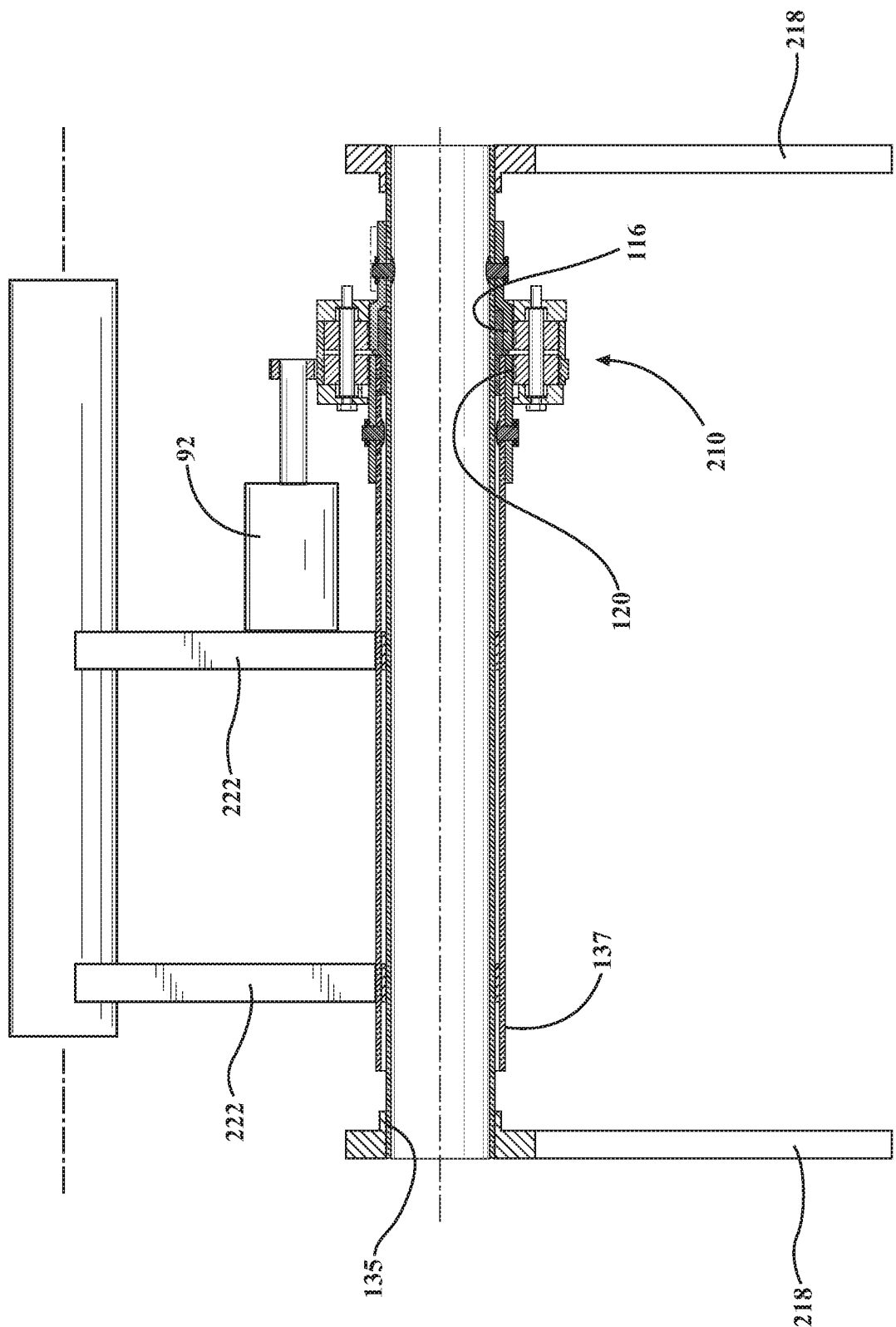
FIG. 14C is a cross-sectional view through an actuator used on the lift arm arrangement of FIG. 14A.

Referring to the lift arm arrangement shown in FIGS. 14A through 14C, the actuator 210 can be located between the lifting arms 218. In this case, the tube 135 (or other elongate member), extends between and is fixed to the lifting arms 218. The tube 135 may be solid or hollow. Fixing the tube 135 to the lifting arms 218 provides lateral stability to the lifting arms 218 when various loads are placed on the patient support deck 58, such as when loads from patients or equipment are concentrated near an edge of the patient support deck 58. Additionally, the tube 135 adds torsional strength or stiffness to the lift arm arrangement by forming a single rigid body with the lifting arms 218. Furthermore, by virtue of the hollow nature of the actuator 210, the tube 135 is able to pass through the actuator 210 thereby enabling the lifting arms 218 to be located on either side of the actuator 210.

Referring to FIG. 14C, in the embodiment shown, the moving sun gear 116 is fixed to the tube 135. The fixed sun gear 120 is fixed to the outer tube 137. The outer tube 137 is fixed to the second timing arms 222. The motor 92 is shown fixed to one of the second timing arms 222 to power the actuator 210 (other motor mounting locations are possible as previously described). During operation, the moving sun gear 116 rotates relative to the fixed sun gear 120 to pivot the lifting arms 218 about joint 224, which in turn pivots one end of the lifting arms 218 about joint 220 and the causes the other end of the lifting arms 218 to slide along the base 202. At the same time, the timing arms 222 also pivot about joint 226 and the outer tube 137 rotates relative to the tube 135. In other embodiments, the tube 135 could be fixed to the timing arms 222 with the outer tube 137 fixed to the lifting arms 218. Owing to the hollow configuration of the actuator 210, the actuator 210 could be located anywhere along the tube 135. Similarly, one actuator 210 can be employed to move both of the lifting arms 218. In some cases, if desired, the tube 135 is able to rotate through 360 degrees or more.

In some embodiments, the configuration of the lift arm arrangement shown in FIGS. 14A through 14C with a single actuator 210 being disposed between the lifting arms 218 may be used for the patient support deck 58 embodiment of FIGS. 2 through 8 with one actuator 210 configured to drive relative movement between the fowler section 82 and the seat section 80, and another actuator 210 configured to drive relative movement between the seat section 80 and the foot section 84. The patient support deck 58 of this embodiment requires two actuators 210, one actuator 210 between each section, in contrast to the four actuators 210 shown in FIGS. 2 and 3.

In another embodiment shown in FIG. 16, the lift system 200 comprises a head end upper arm 228 pivotally coupled to the intermediate frame 204 at the head end joint 208 and a head end lower arm 230 pivotally coupled to the base 202 at the head end base joint 216. The head end upper arm 228 is pivotally coupled to the head end lower arm 230 at a head end middle joint 232. The lift system 200 further comprises a foot end upper arm 234 pivotally coupled to the intermediate frame 204 at the foot end joint 220 and a foot end lower arm 235 pivotally coupled to the base 202 at the foot end base joint 226. The foot end upper arm 234 is pivotally coupled to the foot end lower arm 235 at a foot end middle joint 238. It should be appreciated that although reference is made to only a single head end upper arm 228, a single head end lower arm 230, a single foot end upper arm 234, and a single foot end lower arm 235, multiples of such arms could also be employed.

The lift system comprises multiple actuators 210. One actuator 210 is coupled to each of the head end middle joint 232, the foot end middle joint 238, the head end base joint 216, and the foot end base joint 226. One of the head end upper 228 lower 230 arms is a movable member and one of the foot end upper 234 and lower 235 arms is another movable member. The actuator 210 coupled to the head end middle joint 232 drives movement of the head end upper 228 and lower 230 arms relative to each other. The actuator 210 coupled to the foot end middle joint 238 drives movement of the foot end upper 234 and lower 235 arms relative to each other. The actuator 210 coupled to the head end base joint 216 drives movement of the head end lower arm 230 relative to the base 202. The actuator 210 coupled to the foot end base joint 226 drives movement of the foot end lower arm 235 relative to the base 202. The actuators 210 in this embodiment, operate in concert to raise and lower the intermediate frame 204 relative to the base 202. In an alternative embodiment, one of the actuators 210 may drive movement of one of the movable members to raise and lower either the head end or the foot end such that the intermediate frame 204 does not remain horizontal with the floor surface. In further embodiments, the actuators 210 can be driven at different speeds to provide Trendelenburg or reverse Trendelenburg movement.

In another embodiment shown in FIG. 17, the lift system 200 comprises a center lifting arm 240 pivotally coupled to the intermediate frame 204 at a top joint 242 and pivotally coupled to the base 202 at a bottom joint 244. It should be appreciated that although reference is made to only a single center lifting arm 240 multiple center lifting arms 240 could also be employed. In this embodiment, two actuators 210 are utilized for raising and lowering the intermediate frame 204 relative to the base 202. More specifically, one actuator 210 is coupled to the top joint 242 and another actuator 210 is coupled to the bottom joint 244. The center lifting arm 240 is a movable member for both actuators 210 and the intermediate frame 204 is a movable member for the actuator 210 at the top joint 242 (to control Trendelenburg and reverse Trendelenburg positioning). The actuators 210 drive movement of the center lifting arm 240 relative to the intermediate frame 204 and base 202 and work in concert to raise and lower the intermediate frame 204 relative to the base 202. Alternatively, one of the actuators 210 may drive movement, while the other actuator 210 remains stationary to raise and lower either the head end or the foot end such that the intermediate frame 204 does not remain horizontal with the floor surface. In further embodiments, the actuators 210 can be driven at different speeds to provide Trendelenburg or reverse Trendelenburg movement.

Figure 18:
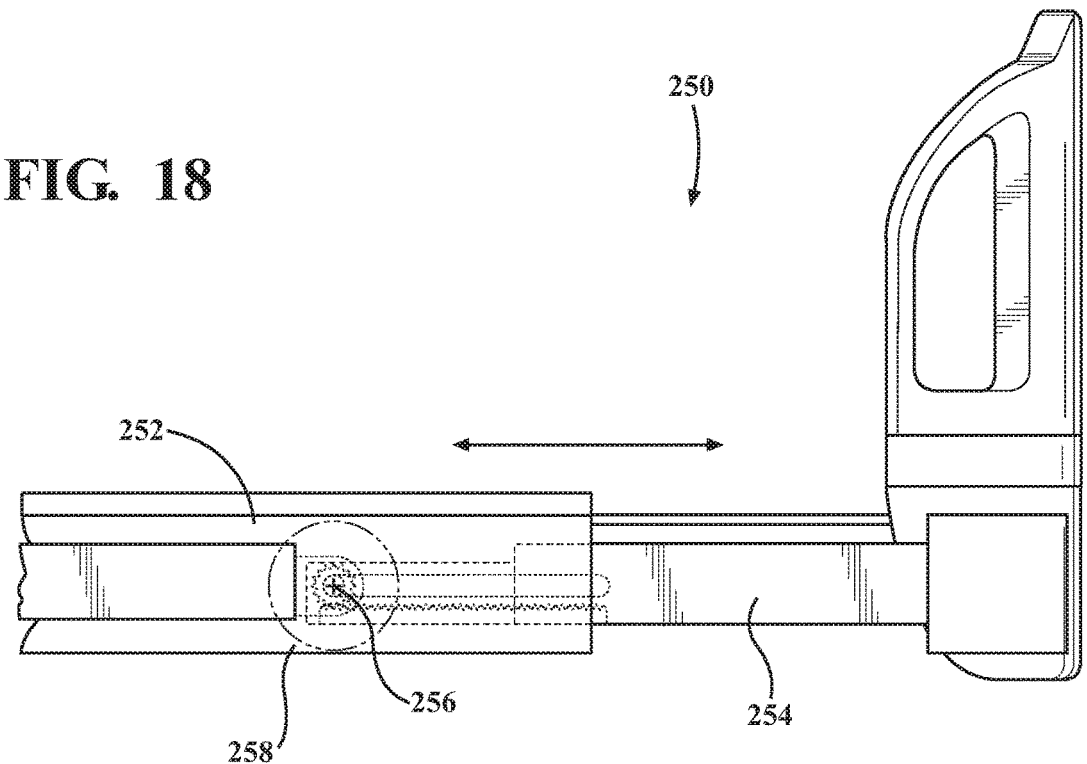
FIG. 18 is an elevational view illustrating the actuator coupled to a bed length extension device.

In another embodiment shown in FIG. 18, the actuator 78 described above may be used for application in a bed length extension device 250. The actuator 78 is hereinafter referenced as actuator 258. The bed length extension device 250 comprises a support frame 252 coupled to an extending member 254 at a joint 256. The bed length extension device 250 adjusts a length of the patient support apparatus 50 to accommodate patients of greater than average height. The actuator 258 is coupled to the support frame 252 and the extending member 254 and drives movement of the extending member 254 relative to the support frame 252 e.g., by driving a gear that slides a toothed rack fixed to the extending member 254. Thus, moving the extending member 254 away from the support frame 252 to lengthen the patient support apparatus 50.

Figure 19:
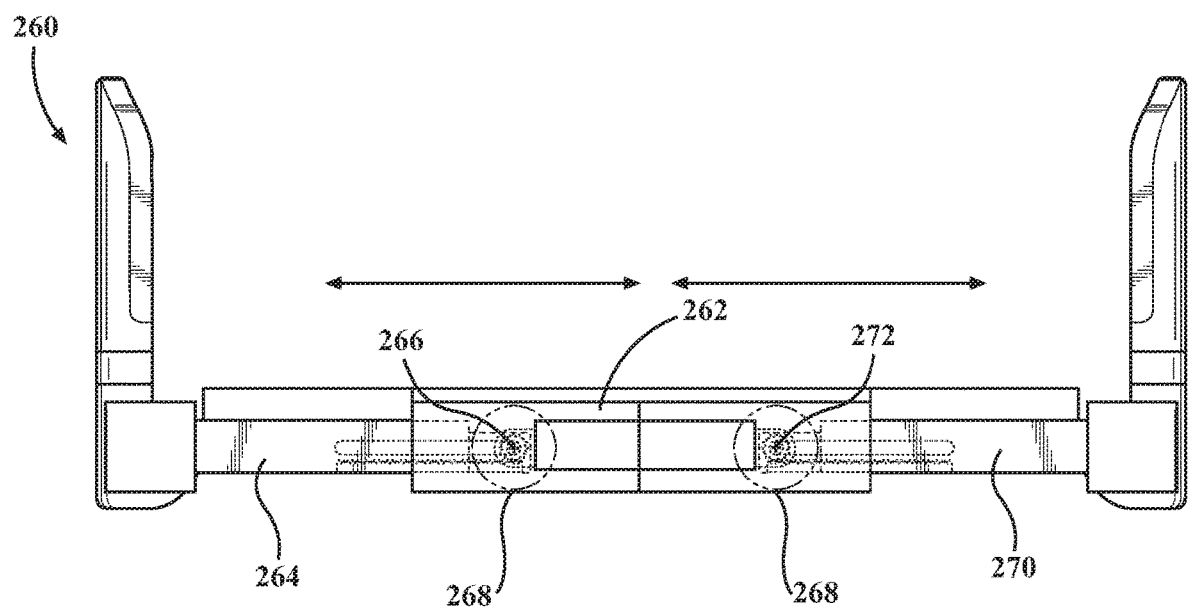
FIG. 19 is an elevational view illustrating the actuator coupled to a bed width extension device.

In another embodiment shown in FIG. 19, the actuator 78 described above may be used for application in a bed width extension device 260. The actuator 78 is hereinafter referenced as actuator 268. The bed width extension device 260 comprises a support frame 262 coupled to a first extending member 264 at a first joint 266. The bed width extension device 260 further comprises a second extending member 270 coupled to the support frame 262 at a second joint 272. The bed width extension device 260 adjusts a width of the patient support apparatus 50 to accommodate patients of greater than average width. One actuator 268 is coupled to the first joint 266 and drives movement of the first extending member 264 relative to the support frame 262 (e.g., by driving a first gear that slides a first toothed rack fixed to the first extending member 264). Another actuator 268 is coupled to the second joint 272 and drives movement of the second extending member 270 relative to the support frame 262 (e.g., by driving a second gear that slides a second toothed rack fixed to the second extending member 270). The first 264 and second 270 extending members move away from the support frame 262 to widen the patient support apparatus 50. In one embodiment, only one of the actuators 268 drives movement of one of the extending members 264, 270 away from the support frame 262.

In another embodiment, the actuator 78 described above may be used anywhere in the patient support apparatus 50 including driving wheels, side rails, footboard, headboard, or any other movable component of the patient support apparatus 50. The gears and other components of the actuator 78 could be formed of metal, plastic, other suitable materials, or combinations thereof. Likewise, the movable members 86 could be formed of metal, plastic, other suitable materials, or combinations thereof.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention claimed is:

1. A patient support apparatus comprising:
a patient support surface;
a first member and a movable member, said movable member movable relative to said first member; and
an actuator coupled to said movable member to move said movable member relative to said first member, said actuator comprising:
a gear assembly having an input member rotatable about a center axis and having external teeth, an output member supported within said input member and rotatable about said center axis, said output member connected to said movable member, and a gear arrangement operable between said input member and said output member; and
a motor supporting a drive gear for rotation, said drive gear spaced radially from said center axis and disposed in meshing relationship with said external teeth of said input member, said motor configured to apply torque to said input member via said drive gear to rotate said output member through said gear arrangement,
said gear assembly defining a through passage, said through passage is configured to permit objects to pass through said gear assembly while said motor applies torque to said input member and rotates said output member.

2. The patient support apparatus of claim 1, comprising an elongate member received within said through passage defined by said gear assembly.

3. The patient support apparatus of claim 2, wherein one of said input member and said output member rotate about said elongate member.

4. The patient support apparatus of claim 2, wherein said gear arrangement comprises a gear fixed to said elongate member.

5. The patient support apparatus of claim 2, comprising a base and an intermediate frame, wherein said elongate member is movable with respect to one of said base and said intermediate frame.

6. The patient support apparatus of claim 2, wherein said input member comprises a ring gear rotatable about a center axis, said output member comprises a first sun gear rotatable about said center axis, and said gear arrangement comprises a second sun gear disposed about said center axis and an array of planet gear clusters disposed in direct meshing relationship with each of said ring gear, said first sun gear, and said second sun gear.

7. The patient support apparatus of claim 6, wherein said first sun gear comprises a first interior surface and said second sun gear comprises a second interior surface, said first and second interior surfaces collectively defining said through passage.

8. The patient support apparatus of claim 6, wherein said gear assembly comprises a carrier rotatable about said center axis, said carrier retaining said array of planet gear clusters in direct meshing relationship with each of said ring gear, said first sun gear, and said second sun gear.

9. The patient support apparatus of claim 6, wherein said elongate member is fixed to one of said first and second sun gears.

10. The patient support apparatus of claim 6, wherein:
said array of planet gear clusters comprises first planet gears spaced from each other and rotatable about respective planet gear axes, each of said first planet gears disposed in direct meshing relationship with said first sun gear such that said first planet gears revolve about said center axis;
said array of planet gear clusters comprises second planet gears rotationally fixed to said first planet gears to rotate with said first planet gears about said planet gear axes and to revolve with said first planet gears about said center axis, each of said second planet gears disposed in direct meshing relationship with said second sun gear; and
each of said first planet gears has a first planet gear diameter and each of said second planet gears has a second planet gear diameter different than said first planet gear diameter.

11. The patient support apparatus of claim 10, wherein:
said array of planet gear clusters comprises two or more of said first planet gears and two or more of said second planet gears;
said motor is configured to rotate said ring gear about said center axis, which rotates said planet gears about said planet gear axes and revolves said array of planet gear clusters about said center axis, which rotates said first sun gear relative to said second sun gear about said center axis and moves said movable member relative to said first member;
each of said first planet gears comprises $N_{FP}$ number of teeth and said first sun gear comprises $N_{MS}$ number of teeth;
each of said second planet gears comprises $N_{SP}$ number of teeth and said second sun gear comprises $N_{FS}$ number of teeth; and
a first ratio of $N_{MS}/N_{FP}$ is different from a second ratio of $N_{FS}/N_{SP}$.

12. The patient support apparatus of claim 10, wherein said first sun gear has more teeth than said second sun gear.

13. The patient support apparatus of claim 1, wherein said gear assembly has a forward drive efficiency and a back drive efficiency, wherein said forward drive efficiency is greater than said back drive efficiency.

14. The patient support apparatus of claim 13, wherein:
said forward drive efficiency defines a proportion of forward drive output power to forward drive input power when said forward drive input power is applied to said input member by said motor and said forward drive output power is available at said output member in response to said forward drive input power,
said back drive efficiency defines a proportion of back drive output power to back drive input power wherein said back drive input power is applied to said output member and said back drive output power is available at said input member in response to said back drive input power.

15. The patient support apparatus of claim 14, wherein said back drive efficiency is 0.0 or less and said forward drive efficiency is 0.5 or less.

16. The patient support apparatus of claim 1, wherein said movable member comprises one or more of a lift member, a patient support deck member, a bed length extension member, a bed width extension member, a wheel, a side rail, a footboard, or a headboard.

17. The patient support apparatus of claim 1, comprising a patient support deck having a base section and a movable section movable relative to said base section, wherein said actuator is mounted to said base section and said movable section comprises said movable member.

18. The patient support apparatus of claim 1, comprising a patient support deck having a fowler section and a seat section, wherein said actuator is mounted to said seat section and said fowler section comprises said movable member.

19. The patient support apparatus of claim 1, comprising a patient support deck having a foot section and a seat section, wherein said actuator is mounted to said seat section and said foot section comprises said movable member.

20. The patient support apparatus of claim 1, comprising a base, a support frame, a first lift member, and a second lift member movable relative to said first lift member to lift and lower said support frame relative to said base, wherein said actuator is mounted to one of said base, said support frame, said first lift member, and said second lift member.

21. The patient support apparatus of claim 1, comprising a pair of said movable members and an elongate member interconnecting said movable members through said through passage defined by said gear assembly, wherein said elongate member is fixed to said movable members and said output member so that rotation of said output member rotates said elongate member and said movable members.

* * * * *